(12) United States Patent
Ohoka et al.

(10) Patent No.: US 9,692,291 B2
(45) Date of Patent: Jun. 27, 2017

(54) NOISE FILTER

(71) Applicants: NIPPON SOKEN, INC., Nishio, Aichi-pref. (JP); DENSO CORPORATION, Kariya, Aichi-pref. (JP)

(72) Inventors: Shinji Ohoka, Okazaki (JP); Shinya Goto, Gifu (JP); Katsutoyo Misawa, Kariya (JP); Yuuki Takemoto, Kariya (JP); Tougo Yamaguchi, Aichi-ken (JP)

(73) Assignees: NIPPON SOKEN, INC., Nishio (JP); DENSO CORPORATION, Kariya (JP)

( * ) Notice: Subject to any disclaimer, the term of this patent is extended or adjusted under 35 U.S.C. 154(b) by 611 days.

(21) Appl. No.: 14/186,255

(22) Filed: Feb. 21, 2014

(65) Prior Publication Data
US 2014/0233282 A1    Aug. 21, 2014

(30) Foreign Application Priority Data
Feb. 21, 2013    (JP) .................................. 2013-031654

(51) Int. Cl.
| H04B 3/00 | (2006.01) |
| H04B 15/00 | (2006.01) |
| H02M 1/14 | (2006.01) |
| H02M 3/337 | (2006.01) |

(52) U.S. Cl.
CPC ........... *H02M 1/14* (2013.01); *H02M 3/3376* (2013.01)

(58) Field of Classification Search
CPC .............................. H02M 1/14; H02M 3/3376
USPC .......................................................... 307/91
See application file for complete search history.

(56) References Cited

U.S. PATENT DOCUMENTS

| 6,181,218 B1 * | 1/2001 | Clark ........................ H03B 5/32 331/177 R |
| 6,898,092 B2 * | 5/2005 | Briere ...................... H02M 1/44 363/39 |
| 2012/0119723 A1 * | 5/2012 | Mizutani ............... H02M 3/158 323/311 |
| 2012/0161900 A1 | 6/2012 | Sakoda et al. |
| 2014/0062446 A1 * | 3/2014 | Ikriannikov ............ H02M 1/14 323/304 |

(Continued)

FOREIGN PATENT DOCUMENTS

| JP | 2001-077650 | 3/2001 |
| JP | 2011-223314 | 11/2011 |
| JP | 2012-135175 | 7/2012 |

*Primary Examiner* — Richard Tan
(74) *Attorney, Agent, or Firm* — Nixon & Vanderhye PC

(57) ABSTRACT

A noise filter is assembled to an electric power conversion device and has a metal housing casing and two capacitors connected to an external terminal of the device through which an electric power conversion circuit is connected to an external device. The two capacitors, the housing casing and the external terminal make a current loop. A magnetic flux of an alternating magnetic field generated in a part of the electric power conversion circuit penetrates in a first area and a second area formed in the current loop. A first induced noise current is induced in the current loop when the magnetic flux of the generated magnetic field penetrates in the first area. A second induced noise current is induced in the current loop when the magnetic flux penetrates in the second area so that the first induced noise current flows in a reverse direction to the second induced noise current.

19 Claims, 16 Drawing Sheets

(56) References Cited

U.S. PATENT DOCUMENTS

2014/0233281 A1\* 8/2014 Goto ................... H02M 7/003
  363/39
2015/0171736 A1\* 6/2015 Takemoto ............... H02M 1/44
  363/17

\* cited by examiner

NOISE FILTER

CROSS-REFERENCE TO RELATED APPLICATION

This application is related to and claims priority from Japanese Patent Application No. 2013-31654 filed on Feb. 21, 2013, the contents of which are hereby incorporated by reference.

BACKGROUND OF THE INVENTION

1. Field of the Invention

The present invention relates to noise filters equipped with two capacitors.

2. Description of the Related Art

A conventional technique, for example, Japanese patent laid open publication No. 2012-135175 has disclosed an electric power conversion device for boosting, i.e. increasing a direct current (DC) voltage, and/or decreasing a DC voltage, which is equipped with one or more noise filters. The noise filters decreases and removes a noise current. The noise filter is electrically connected to an input terminal and/or an output terminal of the electric power conversion device. The noise filter removes a noise current which would otherwise be transmitted from an external device into the inside of the electric power conversion device through the input terminal. A noise current generated in the electric power conversion device is also transmitted to the outside device through the output terminal. For example, the noise filter is generally comprised of a capacitor, a coil, and conducting wires connected to the electric components in the electric power conversion device.

However, there is a possibility that the noise filter composed of the capacitor and/or the conducting wires generates a noise current. That is, an electric power conversion circuit in the electric power conversion device has one or more electric components in which an alternating current (AC) flows. The flow of an AC current generates an AC magnetic field. Further, interaction between the generated AC magnetic field with the capacitor and the conducting wires generates a noise current (i.e. an induced noise current). The induced noise current is transmitted to the external device through the output terminal of the electric power conversion circuit. So, there is a strong demand to provide a noise filter having a function capable of preventing a large induced noise current from mixing with an output current of the electric power conversion device and being transmitted to the external device through the external terminal of the electric power conversion device even if an AC magnetic field is generated in the electric power conversion circuit.

SUMMARY

It is therefore desired to provide a noise filter capable of preventing a large induced noise current from mixing with an output current of an electric power conversion device, and from being transmitted to an external device through an external terminal of the electric power conversion device.

An exemplary embodiment provides a noise filter connected to an external terminal through which an electric power conversion circuit is electrically connected to an external device. The noise filter is comprised of a housing casing made of metal which is electrically grounded, a first capacitor and a second capacitor accommodated in the housing casing. A first electrode of each of the first capacitor and the second capacitor is electrically connected to the external terminal. A second terminal of each of the first capacitor and the second capacitor is electrically connected to the housing casing. The first capacitor, the second capacitors, the external terminal and the housing casing form a current loop so that a first area and a second area is formed in the current loop and a magnetic flux of an alternating magnetic field generated in a part of the electric power conversion circuit penetrates in the first area and the second area. A first induced noise current is induced in the current loop when the magnetic flux of the generated magnetic field penetrates in the first area. A second induced noise current is induced in the current loop when the magnetic flux of the generated magnetic field penetrates in the second area. The first induced noise current flows in a reverse direction to the second induced noise current.

The noise filter is comprised of a housing casing made of metal which is electrically grounded and first capacitor and the second capacitor accommodated in the housing casing. The first capacitor and the second capacitor are accommodated in the housing casing. A first electrode of each of the first capacitor and the second capacitor is electrically connected to the external terminal. A second terminal of each of the first capacitor and the second capacitor is electrically connected to the housing casing so that a current loop is formed by the first capacitor and the second capacitor, the external terminal and the housing casing. A first area and a second area are formed in the current loop so that a magnetic flux of an alternating magnetic field generated in a part of the electric power conversion circuit penetrates in the first area and the second area. A first induced noise current is induced in the current loop when the magnetic flux of the generated magnetic field penetrates in the first area. A second induced noise current is induced in the current loop when the magnetic flux of the generated magnetic field penetrates in the second area. The first induced noise current and the second induced noise current are reversed with respect to each other.

In the noise filter according to an exemplary embodiment of the present invention, the current loop is formed by the first capacitor and the second capacitor, the external terminal and the housing casing. A current flows in the current loop. A magnetic flux of the alternating magnetic field is generated in the part of the electric power conversion circuit. The first induced noise current is generated when the generated magnetic flux penetrates in the first area. Further, the second induced noise current is generated when the generated magnetic flux penetrates in the second area. In particular, the first induced noise current and the first induced noise current are generated and flow in the current loop in a reverse direction to each other. It is therefore possible for the first induced noise current and the second induced noise current to cancel out with each other. As a result, the first induced noise current and the second induced noise current are weakened together. This makes it possible to prevent transmission of a large induced noise current to the external terminal of the electric power conversion device.

The present invention provides the noise filter capable of preventing transmission of a large induced noise current to the external terminal of the electric power conversion device.

BRIEF DESCRIPTION OF THE DRAWINGS

A preferred, non-limiting embodiment of the present invention will be described by way of example with reference to the accompanying drawings, in which.

DETAILED DESCRIPTION OF THE PREFERRED EMBODIMENTS

Figure 1:
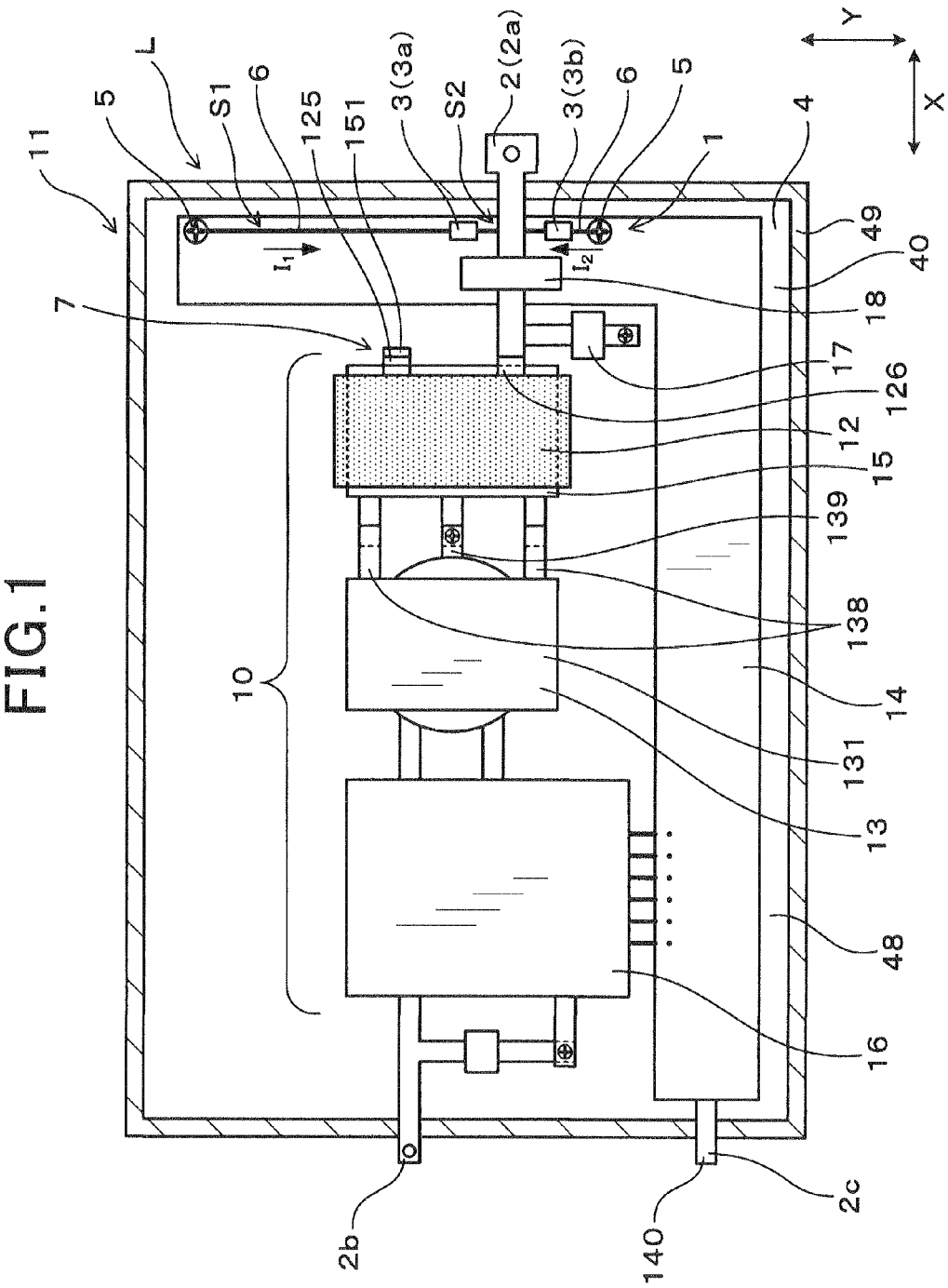
FIG. 1 is a plan view showing a noise filter according to a first exemplary embodiment of the present invention assembled to an electric power conversion device.

Hereinafter, various embodiments of the present invention will be described with reference to the accompanying drawings. In the following description of the various embodiments, like reference characters or numerals designate like or equivalent component parts throughout the several diagrams.

There are various types of generation sources, capable of generating an alternating current (AC) magnetic field, for example, an output terminal of a diode module, a choke coil, a transformer, etc. assembled in an electric power conversion device in an electric power conversion device.

In the electric power conversion circuit serves as a voltage reduction circuit for decreasing a voltage of a high direct current (DC) power source. A low DC power source is changed by using the decreased DC voltage.

It is preferable for a current ratio of a first induced noise current to a second induced noise current to be within a range of 0.8 to 1.2. In this range of the current ratio, because a magnitude of the first induced noise current becomes approximately equal to a magnitude of the second induced noise current, and the first induced noise current flows in a reverse direction of the second induced noise current. This range of the current ratio makes it possible to cancel the first induced noise current and the second induced noise current together, and decrease a residual induced noise current to flow into the external terminal of the electric power conversion device.

Further, it is preferable for the current ratio of the first induced noise current to the second induced noise current to be within a range of 0.9 to 1.1. This range of the current ratio makes it possible to further decrease such a residual induced noise current to flow into the external terminal of the electric power conversion device.

It is also preferable that the first electrode and the second electrode of each of the first capacitor and the second capacitor are electrically connected to conducting wires, and the first capacitor and the second capacitor are electrically connected to the external terminal and the housing casing through the conducting wires.

In this case, the presence of the conducting wires makes it possible to increase the area of the current loop and to allow the magnetic flux of the generated alternating magnetic field to easily penetrate in the first area and the second area formed in the current loop. It is therefore possible to easily generate the first induced noise current and the second induced noise current, which are cancel each other out and a whole induced noise current is therefore weakened.

Furthermore, it is preferable that the first capacitor and the second capacitor are electrically connected to a printed circuit board, and a first metal strut and a second metal strut made of metal project in a normal direction of a bottom surface of the housing casing from the bottom surface of the housing casing so that the printed circuit board is supported by the first and second metal struts, and the first and second struts form a part of the current loop.

In this structure, the presence of the first and second struts makes it possible to increase the area of the current loop, and allow the magnetic flux to easily penetrate in the first area and the second area in the current loop. This makes it possible to promote the generation of the first induced noise current and the second induced noise current, which flow in a reverse direction to each other, and cancel out to each other. As a result, the first induced noise current and the second induced noise current are weakened.

In addition, because the first capacitor and the second capacitor are fixed to the printed circuit substrate, it is possible to electrically connect the first capacitor and the second capacitor to the external terminal and the housing casing through the conducting wires formed on the printed circuit substrate.

Furthermore, because the current loop is also formed by the first and second metal struts which support the printed circuit substrate, it is not necessary to divide the struts to one group which supports the printed circuit substrate and to the other group to be used for making the current loop. This can decrease the total number of the struts in the electric power conversion device and allow the housing casing to have a simple structure.

Still further, it is preferable that an alternating current flows in the normal direction of the bottom surface of the housing casing when the alternating magnetic field is generated by the flow of the alternating current, and a first distance is equal to a second distance, which are measured along the normal direction of the bottom surface of the housing casing. That is, the first distance is a length between the first metal strut and an alternating magnetic field generation part in which the alternating current flows. The second distance is a length between the second metal strut and the alternating magnetic field generation part. This structure makes it possible to easily generate the first induced noise current and the second induced noise current which flow in a reverse direction to each other. That is, because the alternating current flows in the normal direction of the bottom surface of the housing casing, the alternating magnetic field forms a cylindrical shape around the alternating current flowing in the normal direction of the bottom surface of the housing casing. This makes it possible for the magnetic flux of the generated magnetic field to easily penetrate in the first area and the second area.

In addition, it is arranged that the first distance and the second distance, which are measured along the normal direction of the bottom surface of the housing casing from the first metal strut and the second metal strut to the alternating magnetic field generation part, respectively, are equal distances. This makes it possible that a magnitude of the magnetic flux penetrating in the first area becomes equal to a magnitude of the magnetic flux penetrating in the second area. It is therefore possible to generate the first induced noise current and the second induced noise current having approximately the same magnitude and cancel the first induced noise current and the second induced noise current together. As a result, this weakens a whole induced noise current, i.e. a residual induced noise current.

First Exemplary Embodiment

A description will be given of the noise filter in the electric power conversion device according to a first exemplary embodiment with reference to FIG. 1 to FIG. 9.

Figure 2:
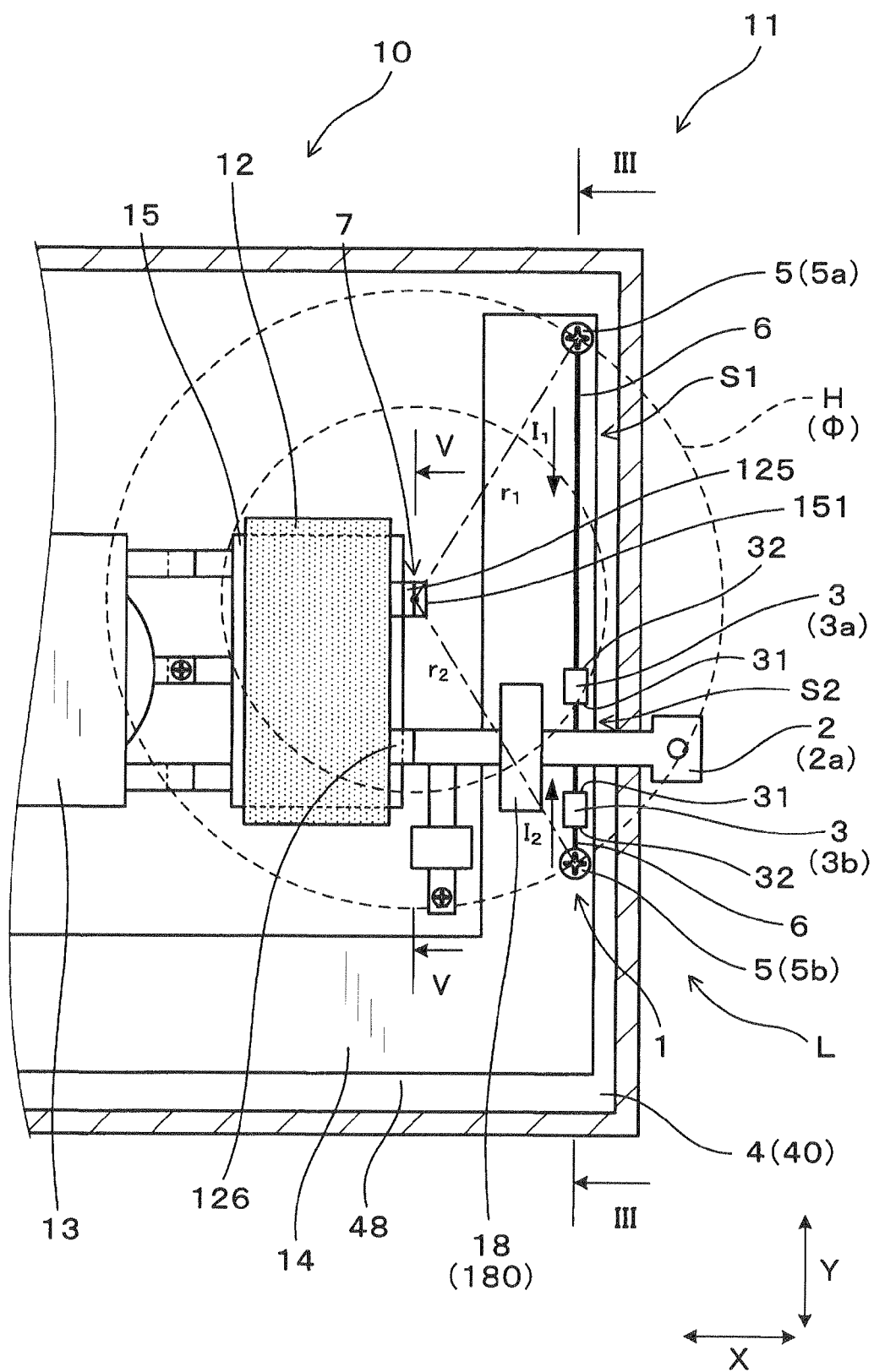
FIG. 2 is a partial enlarged view showing the noise filter assembled to the electric power conversion device shown in FIG. 1.

FIG. 1 is a plan view showing a noise filter 1 according to the first exemplary embodiment assembled to an electric power conversion device 11 equipped with an electric power generation device 10. FIG. 2 is a partial enlarged view showing the noise filter 1 assembled to the electric power conversion device shown in FIG. 1

As shown in FIG. 1, the noise filter 1 according to the first exemplary embodiment is connected to an external terminal 2 of the electric power conversion circuit 10. The noise filter 1 is comprised of a capacitor assembly 3 composed of a first capacitor 3a and a second capacitor 3b, and a housing casing 4 which is grounded. The first capacitor 3a and the second capacitor 3b are accommodated in the housing casing 4.

Figure 3:
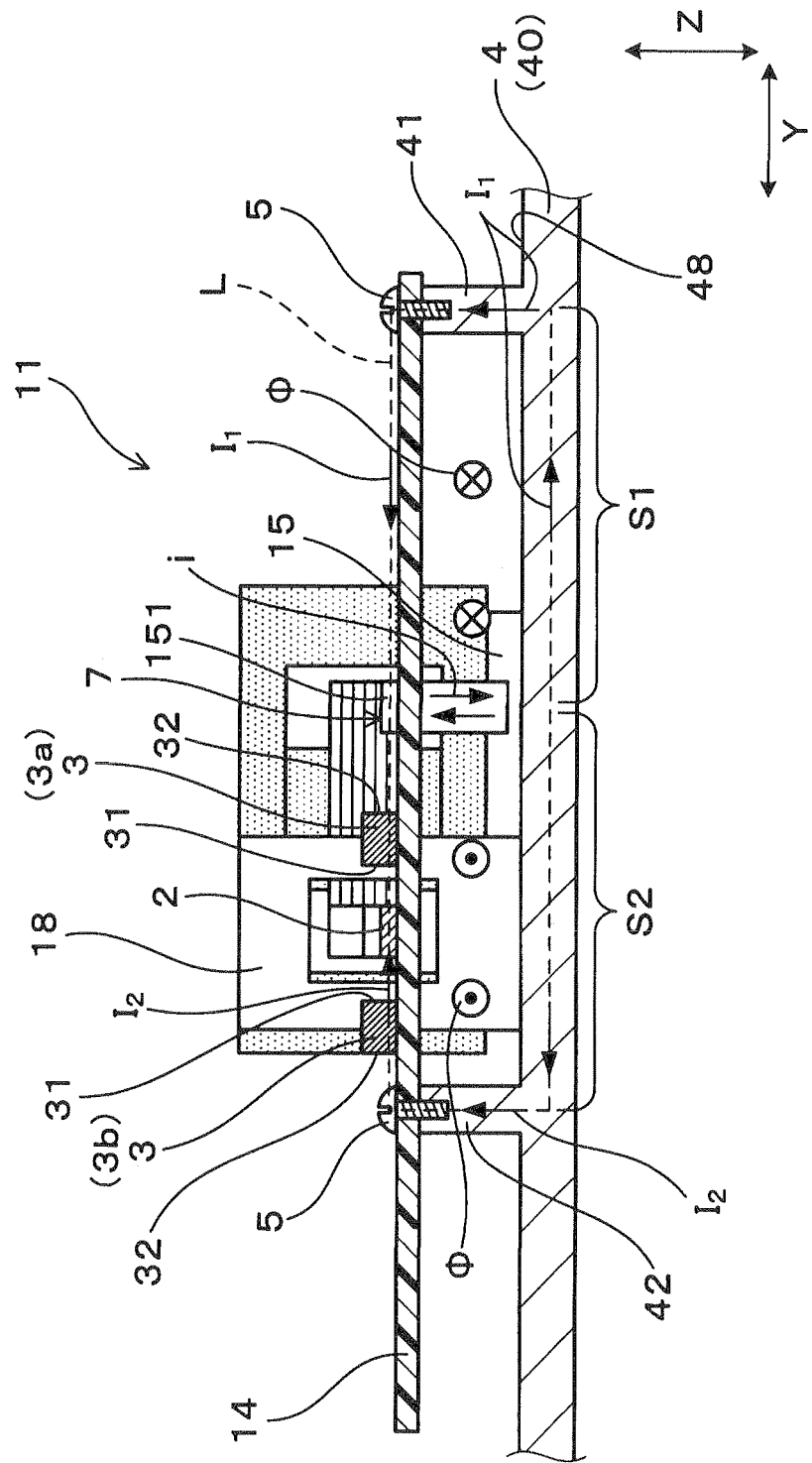
FIG. 3 is a view showing a cross section along the line III-III shown in FIG. 2.

FIG. 3 is a view showing a cross section along the line shown in FIG. 2. As shown in FIG. 2 and FIG. 3, a first electrode 31 of each of the first capacitor 3a and the second capacitor 3b is electrically connected to the external terminal 2 of the electric power conversion device 11. A second electrode 32 of each of the first capacitor 3a and the second capacitor 3b is electrically connected to the housing casing 4.

As shown in FIG. 1, the housing casing 4 is comprised of a bottom wall 40 and a side wall 49 which stands on the bottom wall 40. One or more electric components are fixed to the bottom wall 40. As shown in FIG. 3, the first capacitor 3a, the second capacitor 3b, the external terminal 2 and the housing casing 4 make a current loop L in which an induced noise current flows.

As shown in FIG. 3, a first area S1 and a second area S2 are formed in the current loop L. A magnetic flux $\phi$ of an alternating magnetic field H is generated by a part (which corresponds to an alternating magnetic field generation section 7) of the electric power conversion circuit 10. The magnetic flux $\phi$ of an alternating magnetic field H penetrates in the first area S1 and the second area S2.

A first induced noise current I1 is induced in the current loop L when the magnetic flux $\phi$ of an alternating magnetic field H penetrates in the first area S1. Similarly, a second induced noise current I2 is induced in the current loop L when the magnetic flux $\phi$ of an alternating magnetic field H penetrates in the second area S2.

The electric power conversion circuit 10 in the electric power conversion device 11 disclosed in the first exemplary embodiment is a voltage reduction circuit (see FIG. 9, which will be explained later). The voltage drop circuit decreases a DC voltage of a high voltage DC power source 8 and a low voltage DC power source 80 is charged by the decreased DC voltage.

As shown in FIG. 1, the electric power conversion circuit device 11 has the external terminal 2 composed of an output terminal 2a, an input terminal 2b and a signal terminal 2c. In the first exemplary embodiment, only the output terminal 2a in the external terminal 2 composed of the three terminals 2a, 2b and 2c is electrically connected to the noise filter 1.

In the structure of the electric power conversion device 11 of the first exemplary embodiment shown in FIG. 1 and FIG. 3, the capacitor 3 is fixed to the printed circuit substrate 14. The printed circuit substrate 14 is supported by two metal struts 41 and 42, i.e. a first metal strut and a second metal strut. Each of the first metal strut 41 and the second metal strut 42 projects from the bottom surface 48 of the housing casing 4 in a normal direction (Z direction) of the bottom surface 48 of the housing casing 4. The printed circuit substrate 14 is fixed to the first metal strut 41 and the second metal strut 42 by using bolts 5. The external terminal 2 is mounted on the printed circuit substrate 14.

As shown in FIG. 2 and FIG. 3, one electrode (as a first electrode) of each of the first capacitor 3a and the second capacitor 3b is electrically connected to the external terminal through a conducting wire 6. The conducting wires 6 are patterned on the surface of the printed circuit substrate 14. The other electrodes (as a second electrode) of the first capacitor 3a and the second capacitor 3b are electrically connected to the first metal strut 41 and the second metal strut 42, respectively, through other conducting wires 6 and the bolts 5. The conducting wires are extended in a straight line. The current loop L is comprised of the conducting wires 6, the external terminal 2, the bolts 5, the first metal strut 41, the second metal strut 42 and the housing casing 4.

Figure 9:
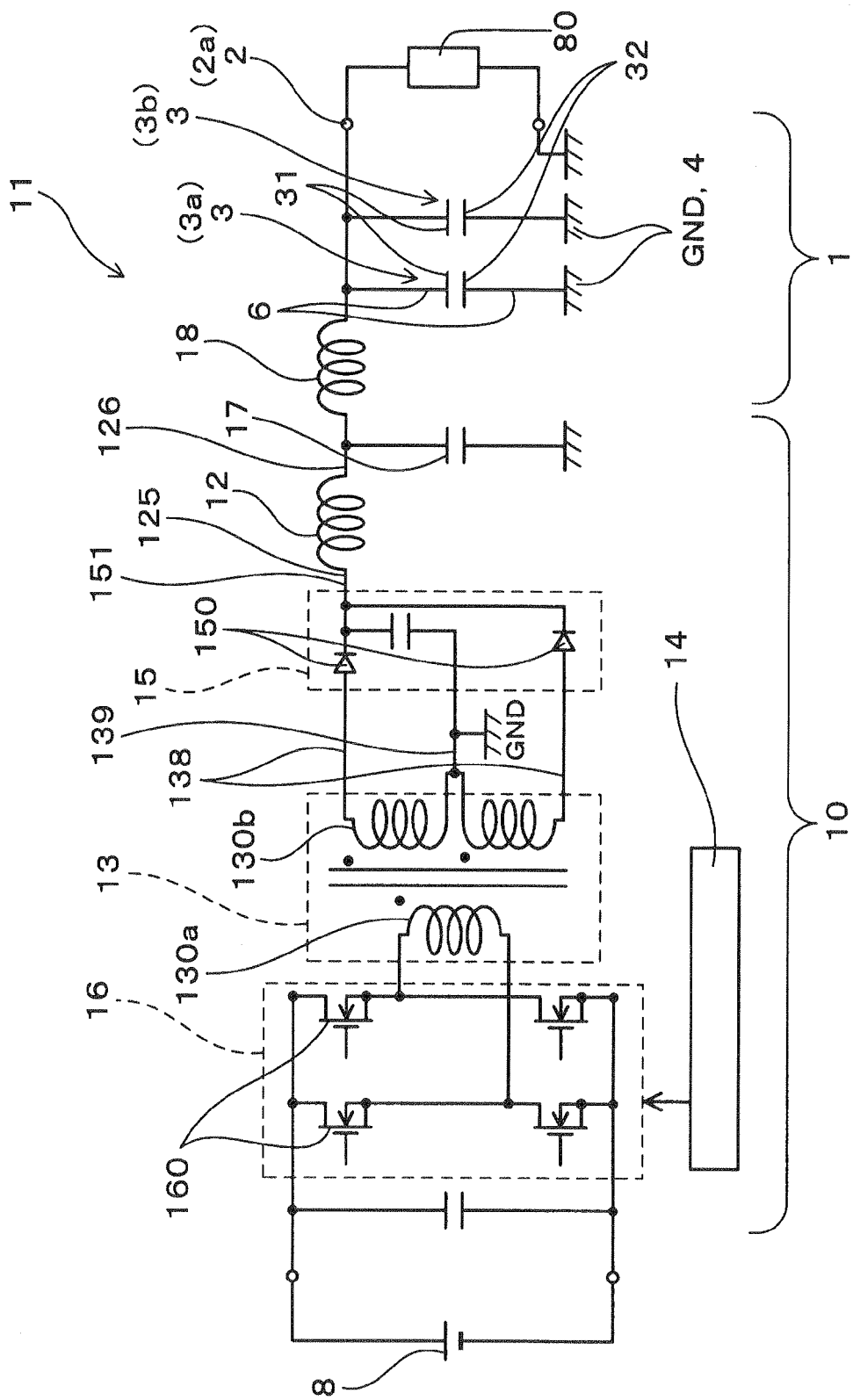
FIG. 9 is a view showing a configuration of an electric power conversion circuit in the electric power conversion device in which the noise filter according to the first exemplary embodiment of the present invention is assembled.

The noise filter 1 according to the first exemplary embodiment is comprised of the first capacitor 3a and the second capacitor 3b, and a filter coil 18 (see FIG. 9). The noise filter 1 according to the first exemplary embodiment can remove a conductive noise current generated in the electric power conversion circuit 10 in order to prevent transmission of such a conductive noise current to the output terminal 2a of the electric power conversion device 11.

The filter core 18 is comprised of a filter core 180 made of a soft magnetic member which surrounds a part of the external terminal 2a.

There is a part (as an alternating magnetic field generation part 7) in the electric power conversion circuit 10 around the noise filter 1, at which an alternating magnetic field H is generated. In the first exemplary embodiment, an alternating magnetic field H is generated at the output terminal 151 of a diode module 15. The diode module 15 will be explained later.

As shown in FIG. 3, an alternating current i flows in a Z direction at the output terminal 151 of the diode module 15. As shown in FIG. 2, the alternating magnetic field H generated at the output terminal 151 has a cylindrical shape around the alternating current i flowing in a Z direction.

As shown in FIG. 2 and FIG. 3, because a magnetic flux $\phi$ of the alternating magnetic field H has a cylindrical shape, the magnetic flux $\phi$ penetrates in two areas, as a first area S1 and a second area S2 in the current loop L.

Figure 4:
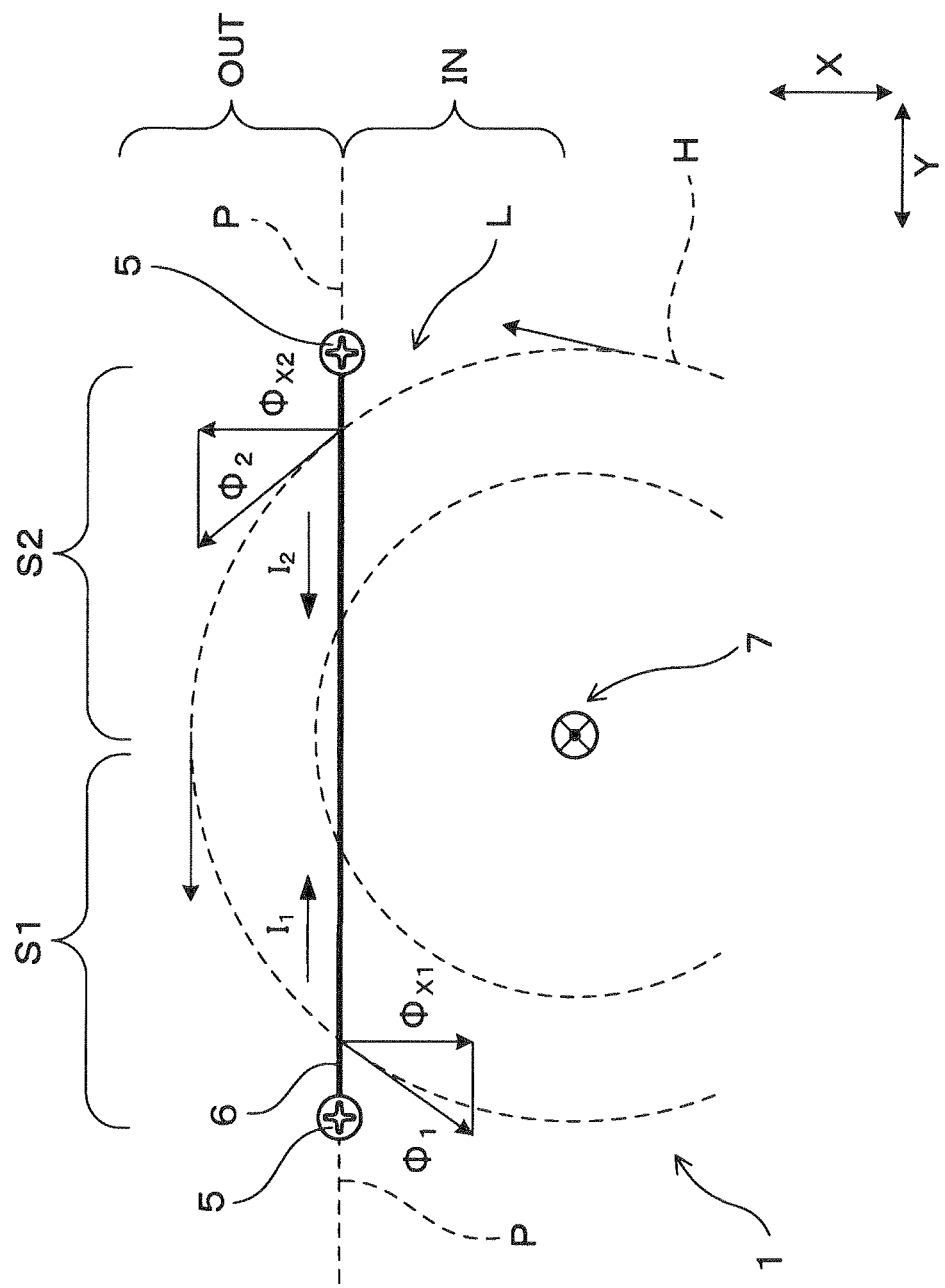
FIG. 4 is a view for explaining a relationship between an alternating current (AC) magnetic field and an induced noise current in the noise filter according to the first exemplary embodiment of the present invention assembled to the electric power conversion device.

FIG. 4 is a view for explaining a relationship between an alternating current (AC) magnetic field and an induced noise current in the noise filter 1 according to the first exemplary embodiment assembled to the electric power conversion device.

As shown in FIG. 4, the magnetic flux $\phi$ penetrates in one of the first area S1 and the second area S2 from a near side IN, which is close to the alternating magnetic field generation section 7 rather than the current loop L, to a far side OUT, which is far from the alternating magnetic field generation section 7 rather than the current loop L. In addition, the magnetic flux $\phi$ penetrates in the other area in the first area S1 and the second area S2 from the far side OUT to the near side IN. That is, the magnetic flux $\phi$ penetrates in the first area S1 and the second area S2 in a reverse direction to each other. This makes it possible to form a first induced noise current I1 generated in the area S1 of the loop L and a second induced noise current I2 generated in the area S2 of the loop L in a reverse direction to each other. The first induced noise current I1 flows in a reverse direction of the second induced noise current I2.

At a certain moment, the magnetic flux $\phi$ penetrates in the current loop L, as shown in FIG. 4, a component $\phi_{X1}$ in an X direction in the magnetic flux $\phi_X$, which penetrates in the first area S1, runs toward the near side IN from the far side OUT. The first induced noise current I1 is generated in the current loop L to prevent the change of the component $\phi_{X1}$ of the magnetic flux $\phi_X$.

Similar to the first induced noise current I1, a component $\phi_{X2}$ in the X direction in the magnetic flux $\phi_X$, which penetrates in the second area S2, is transmitted toward the far side OUT from the near side IN. The second induced noise current I2 is generated in the current loop L to prevent the change of the component $\phi_{X2}$ of the magnetic flux $\phi_X$.

A direction of the alternating magnetic field H changes alternately. Even if the direction of the alternating magnetic field H changes alternately, the component $\phi_{X1}$ and the component $\phi_{X2}$ in the magnetic flux $\phi_X$ in the X direction are in reverse to each other. The first induced noise current I1 and the second induced noise current I2 flow in a reverse direction to each other, and as a result, the first induced noise current I1 and the second induced noise current I2 are cancelled out with respect to each other.

Further, as shown in FIG. 2, the conducting wires 6 are extended in a straight line along the X direction and a Y direction which is perpendicular to the Z direction. In the structure in a direction Z shown in FIG. 2, the distance r1 measured from the alternating magnetic field generation section 7 and the bolt 5a is equal to the distance r2 measured from the alternating magnetic field generation section 7 to the bolt 5b. That is, the alternating magnetic field generation section 7 is arranged on a perpendicular bisector of a straight line which links the bolt 5a and the bolt 5b. This arrangement makes it possible to make equal a magnitude of the magnetic flux $\phi$ penetrating in the first area S1 with a magnitude of the magnetic flux $\phi$ penetrating in the second area S2, and provide the first induced noise current I1 and the second induced noise current I2 having the same strength. Specifically, the first exemplary embodiment provides the noise filter 1 having a current ratio I1/I2 of the first induced noise current I1 to the second induced noise current I2 within a range of 0.8 to 1.2.

FIG. 9 is a view showing a configuration of an electric power conversion circuit 10 in the electric power conversion device 11 in which the noise filter 1 according to the first exemplary embodiment is assembled.

As shown in FIG. 9, the electric power conversion circuit 10 is comprised of a MOS module 16, a transformer 13, the diode module 15, a choke coil 12, a smoothing capacitor 17 and the printed circuit substrate 14 (as a control circuit). The MOS module 16 is electrically connected to the high voltage DC power source 8. The MOS module 16 is comprised of four MOS elements 160 to form a H bridge circuit.

An output terminal of the MOS module 16 is electrically connected to a primary coil 130a of the transformer 13. The transformer 13 decreases a voltage of the high voltage DC power source 8. An output terminal 138 of a secondary coil 130b of the transformer 13 is electrically connected to the diode module 15. A central tap 139 of the transformer 13 is electrically connected to the housing casing 4, in other words, grounded.

The diode module 15 is equipped with two diodes 150. The two diodes 150 rectify an output voltage of the transformer 15. An output terminal of the diode module 15 is electrically connected to the choke coil 12. An output terminal of the choke coil 12 is electrically connected to the smoothing capacitor 17 and the filter core 18. The choke coil 12 and the smoothing capacitor 17 smooth a waveform of a voltage rectified by the diode module 15.

As previously described, the noise filter 1 according to the first exemplary embodiment is comprised of the filter coil 18 and the first capacitor 3a and the second capacitor 3b. The first electrode 31 of each of the first capacitor 3a and the second capacitor 3b is electrically connected to the external terminal 2 (i.e. the output terminal 2a), and the second electrode 3b of each of the first capacitor 3a and the second capacitor 3b is electrically connected to the housing casing 4. Because a switching operation of the MOS element 160 is performed in the electric power conversion circuit 10, a conductive noise current is generated in the electric power conversion circuit 10. The noise filter 1 removes such a conductive noise current in order to prevent transmission of the conductive noise current to an external device through the output terminal 2a.

Figure 5:
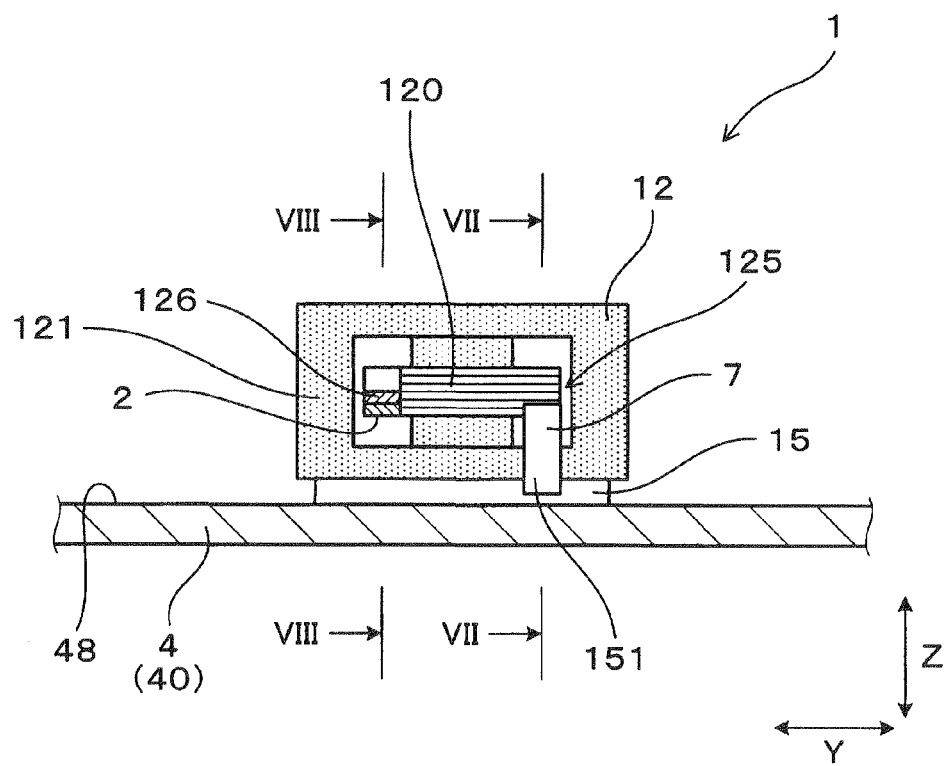
FIG. 5 is a view showing a cross section along the V-V line shown in FIG. 2.
Figure 7:
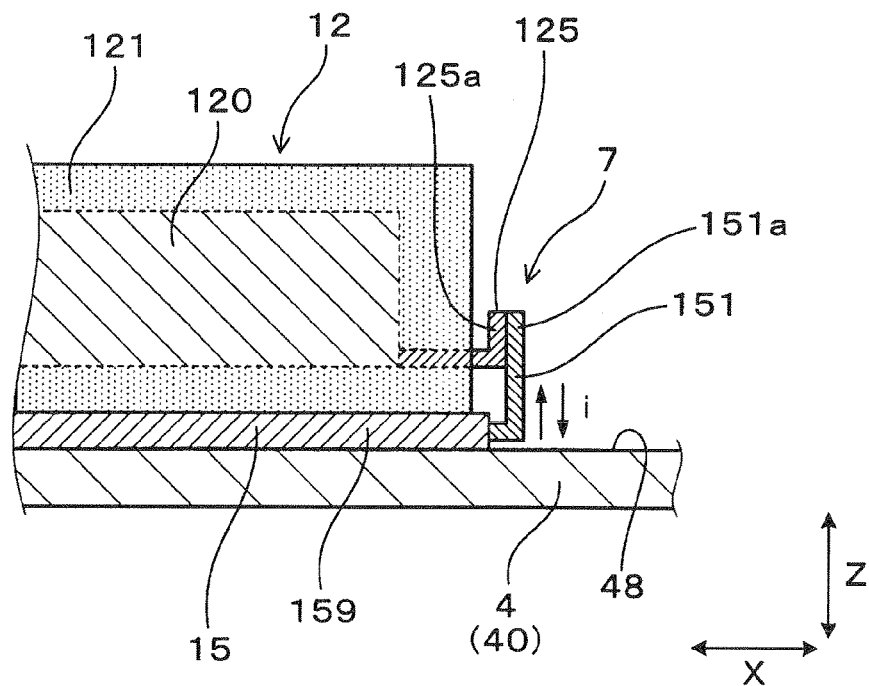
FIG. 7 is a view showing a cross section along the VII-VII line shown in FIG. 5.

FIG. 5 is a view showing a cross section along the V-V line shown in FIG. 2. FIG. 7 is a view showing a cross section along the VII-VII line shown in FIG. 5.

On the other hand, in the structure of the first exemplary embodiment shown in FIG. 5 and FIG. 7, the diode module 15 is arranged on the bottom surface of the housing casing 4, and the choke coil 12 is arranged on the diode module 15. The choke coil 12 is comprised of the core 121 made of a soft magnetic member and a winding section 120 arranged in the core 121. The input terminal 125 of the choke coil 12 projects from the winding section 120 in an X direction and a front section 125a of the input terminal 125 is bent in a Z direction as shown in FIG. 7.

Figure 6:
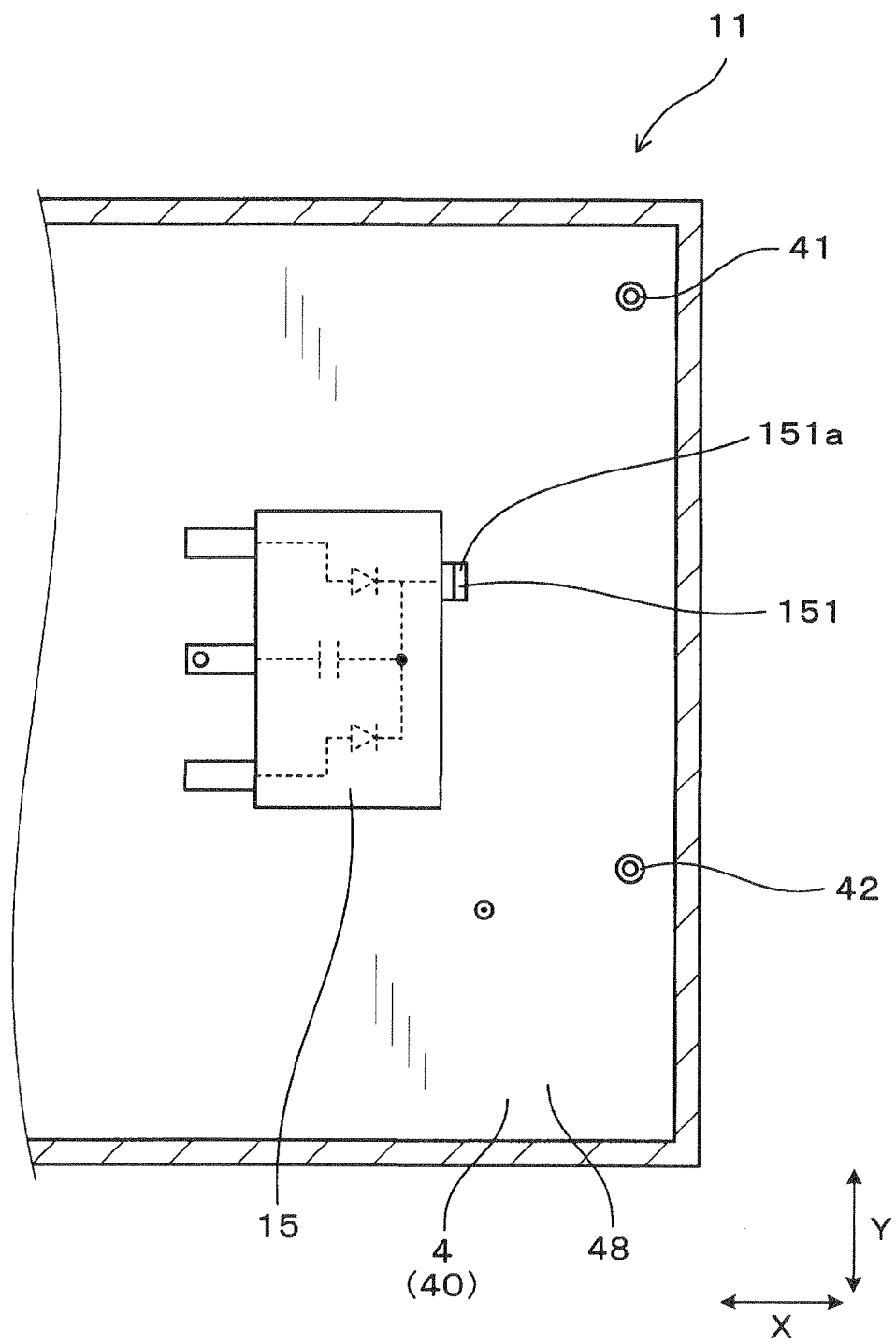
FIG. 6 is a plan view showing a housing casing and a diode module in the electric power conversion device to which the noise filter according to the first exemplary embodiment of the present invention is assembled.

FIG. 6 is a plan view showing the housing casing 4 and the diode module 15 in the electric power conversion device 11 to which the noise filter 1 according to the first exemplary embodiment is assembled.

As shown in FIG. 6 and FIG. 7, the output terminal 151 of the diode module 15 projects from a sealing section 159 in an X direction, and a front section 151a of the output terminal 151 is bent in a Z direction. As shown in FIG. 7, the front section 151a of the output terminal 151 of the diode module 15 and the front section 125a of the input terminal 125 of the choke coil 12 are stacked and then welded together.

As previously described, because the output terminal 151 of the diode module 15 is extended in a Z direction, an output current (an alternating current i) of the diode module 15 flows in a Z direction. Accordingly, an alternating magnetic field H is generated around the output terminal 151 of the diode module 15.

Figure 8:
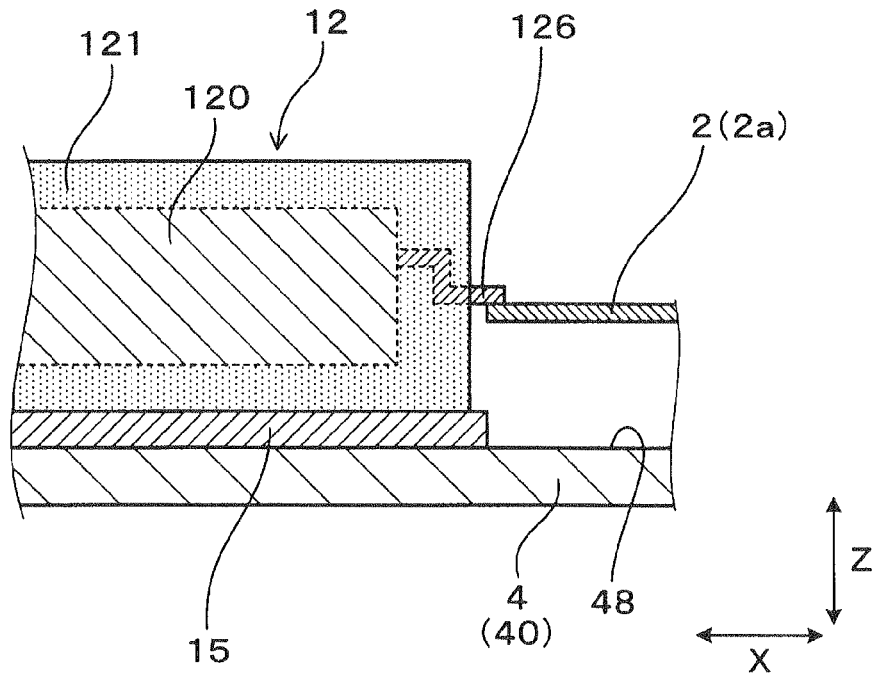
FIG. 8 is a view showing a cross section along the VIII-VIII line shown in FIG. 5.

FIG. 8 is a view showing a cross section along the VIII-VIII line shown in FIG. 5. As shown in FIG. 5 and FIG. 8, an output terminal 126 of the choke coil 12 is extended from the winding section 120 in an X direction. The output terminal 126 of the choke coil 12 and the external terminal 2 (the output terminal 2a) are stacked and then welded together.

A description will now be given of the action and effects of the noise filter 1 according to the first exemplary embodiment.

In the noise filter 1 according to the first exemplary embodiment, the current loop L is composed of the first capacitor 3a, the second capacitor 3b, the external terminal 2 and the housing casing 4.

It is formed so that the magnetic flux $\phi$ of the alternating magnetic field H generated in a part of the electric power conversion circuit 10 penetrates in the first area S1 and the second area 52 in the current loop L. The first induced noise current I1 is generated in the current loop L when the magnetic flux $\phi$ penetrates in the first area S1. The second induced noise current I2 is generated in the current loop L when the magnetic flux $\phi$ penetrates in the second area S2. The first induced noise current I1 flows in the current loop L and the second induced noise current I2 flows in the current loop L so that the first induced noise current I1 is reverse in direction to the second induced noise current I2. Even if the first induced noise current I1 and the second induced noise current I2 are generated in the current loop L, the first induced noise current I1 and the second induced noise current I2 are weakened together because the first induced noise current I1 flows in a direction which is reverse to a direction of the flow of the second induced noise current I2. This makes it possible to prevent a large induced noise current from flowing through the external terminal 2.

In addition, according to the first exemplary embodiment, the current ratio I1/I2 of the first induced noise current I1 to the second induced noise current I2 is within a range of 0.8 to 1.2. Accordingly, because the first induced noise current I1 is approximately equal in magnitude to the first induced noise current I1 in the structure of the electric power conversion device 11 equipped with the noise filter 1 of the first exemplary embodiment second induced noise current I2, it is possible to decrease a residual induction noise current, i.e. a whole induced noise current, obtained by cancelling out the first induced noise current I1 and second induced noise current I2 together. This makes it possible to decrease the residual induction noise current which flows to the external terminal 2.

Further, as shown in FIG. 2, the first electrode 31 and the second electrode 32 of each of the first capacitor 31 and the second capacitor 32 are electrically connected to the conducting wires 6. That is, the first capacitor 31 and the second capacitor 32 are electrically connected to the external terminal 2 and the housing casing 4 through the conducting wires 6. This structure using the conducting wires 6 makes it possible to increase the area of the current loop L. Accordingly, it is possible that the magnetic flux $\phi$ easily penetrates in the first area S1 and the second area S2 in the current loop L, and possible to easily generate the first induced noise current I1 and the second induced noise current I2, which flow in a reverse direction to each other, in the current loop L, and cancel the first induced noise current I1 and the second induced noise current I2 together. As a result, a weakened induced noise current is generated and supplied to the external terminal 2. This makes it possible to prevent transmission of a large induced noise current to the external terminal 2.

Further, as shown in FIG. 3, the first metal strut 41 and the second metal strut 42 projected from the bottom surface 48 of the housing casing 4 can form a part of the current loop L. The presence of the first metal strut 41 and the second metal strut 42 increases the whole area of the current loop L. Accordingly, it is possible that the magnetic flux $\phi$ easily penetrates in the first area S1 and the second area S2 in the current loop L, and possible to easily generate the first induced noise current I1 and the second induced noise current I2, which flow in a reverse direction to each other, in the current loop L, and cancel the first induced noise current I1 and the second induced noise current I2 together and generate a weakened induced noise current to be supplied to the external terminal 2. This makes it possible to prevent transmission of a large induced noise current to the external terminal 2.

Still further, as shown in FIG. 2, the first capacitor 3a and the second capacitor 3b in the capacitor assembly 3 are fixed to the printed circuit substrate 14. This makes it possible to easily connect the first capacitor 3a and the second capacitor 3b to the external terminal 2 and the housing casing 4 through the conducting wires 6 patterned on the printed circuit substrate 14.

Still further, as shown in FIG. 3, the first metal strut 41 and the second metal strut 42, which support the printed circuit substrate 14, are used to form the current loop L. This structure does not require any necessity to divide these struts 41 and 42 into one which supports the printed circuit substrate 14 and the other which is used for making the current loop L. This can decrease the total number of the struts in the electric power conversion device 11 and allow the housing casing 4 to have a simple structure.

Still further, as shown in FIG. 3, an alternating current i to generate an alternating magnetic field H flows in a Z direction at the output terminal 151 of the diode module 15. Accordingly, the alternating magnetic field H has a cylindrical shape around the alternating current i flowing in a Z direction. This structure allows the magnetic flux $\phi$ to easily penetrate in the first area S1 and the second area S2. It is therefore possible to easily generate the first induced noise current I1 and the second induced noise current I2 in the current loop L, where the first induced noise current I1 flows in a reverse direction of the second induced noise current I2.

Still further, as shown in FIG. 2, the distance r1 measured from the alternating magnetic field generation section 7 and the first metal strut 41 (i.e. the bolt 5a) in a direction Z is equal to the distance r2 measured from the alternating magnetic field generation section 7 to the second metal strut 42 (i.e. the bolt 5b) in a direction Z. This makes it possible to have a state in which a magnitude of the magnetic flux φ penetrating in the first area S1 is equal to a magnitude of the magnetic flux φ penetrating in the second area S2. It is therefore possible to allow the first induced noise current I1 to be approximately equal to the second induced noise current I2, and provide a weakened induced noise current by cancelling out the first induced noise current I1 and the second induced noise current I2 to each other.

As previously described in detail, it is possible for the noise filter 1 according to the first exemplary embodiment to have a function capable of preventing transmission of a large induced noise current to the external terminal 2, in other words, capable of providing a weakened induced noise current to the external terminal 2 of the electric power conversion device 11.

It is also preferable for the current ratio I1/I2 of the first induced noise current I1 to the second induced noise current I2 to be within a range of 0.5 to 1.5. When the current ratio I1/I2 is within a range of 0.8 to 1.2, the whole induction noise current can be decreased to a weakened induced noise current which is supplied to the external terminal 2, and an allowable value in practical use. It is most preferable for the current ratio I1/I2 of the first induced noise current I1 to the second induced noise current I2 to have a value of 1.0. However, it is preferable for the current ratio I1/I2 to be within a range of 0.9 to 1.1 for practical use.

In the structure of the first exemplary embodiment previously described, two capacitors such as the first capacitor 3a and the second capacitor 3b are used. The concept of the present invention is not limited by this structure. It is possible to add one or more capacitors connected in parallel to each of the first capacitor 3a and the second capacitor 3b.

It is also possible to form each of the first capacitor 3a and the second capacitor 3b by using a single capacitor or a plurality of capacitor cells.

Second Exemplary Embodiment

A description will be given of the noise filter according to a second exemplary embodiment with reference to FIG. 10 and FIG. 11.

Figure 10:
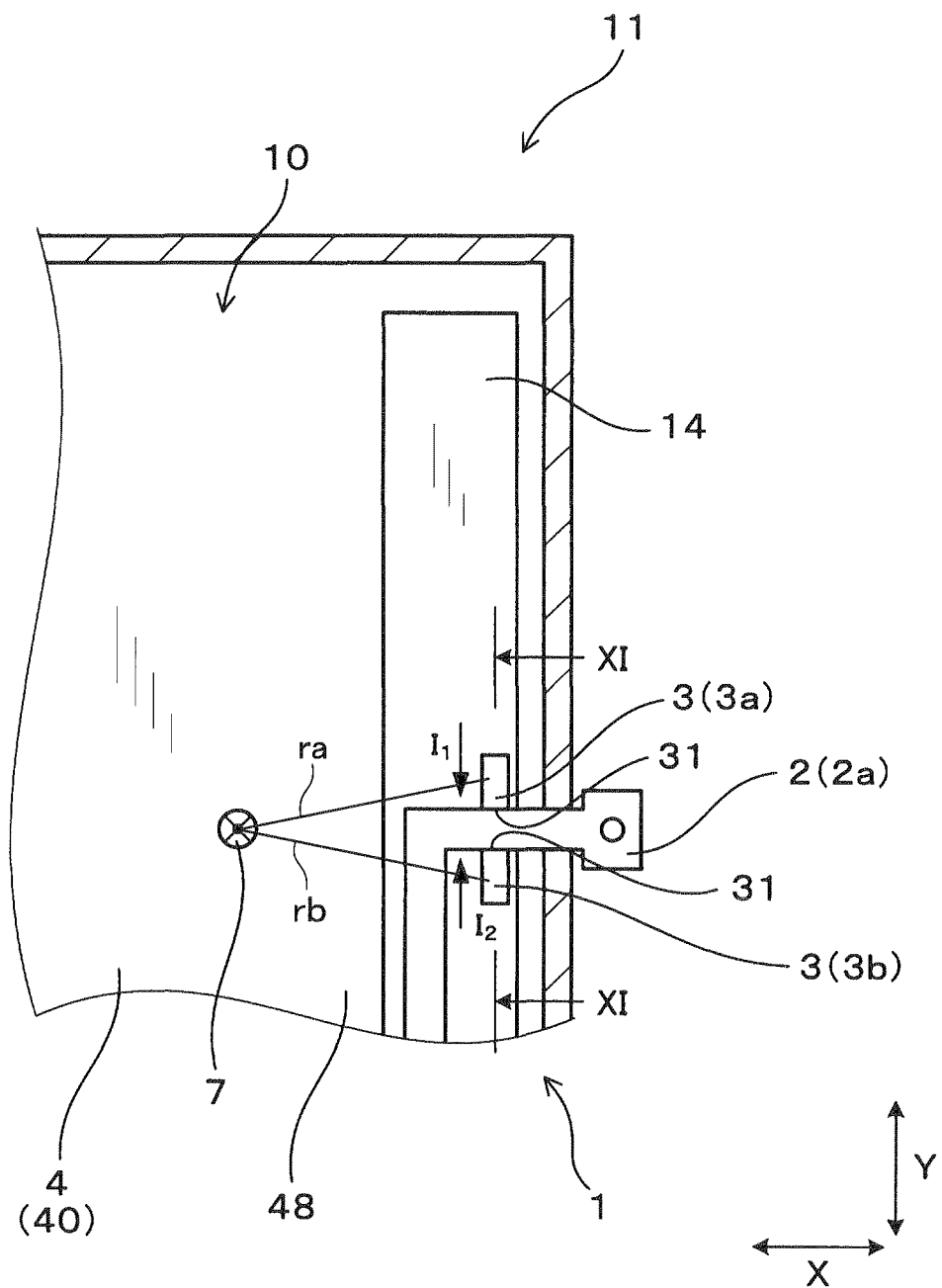
FIG. 10 is a partial enlarged view showing the noise filter according to a second exemplary embodiment of the present invention assembled to the electric power conversion device.

FIG. 10 is a partial enlarged view showing the noise filter according to the second exemplary embodiment assembled to the electric power conversion device. FIG. 11 is a view showing a cross section along the XI-XI line shown in FIG. 10.

Figure 11:
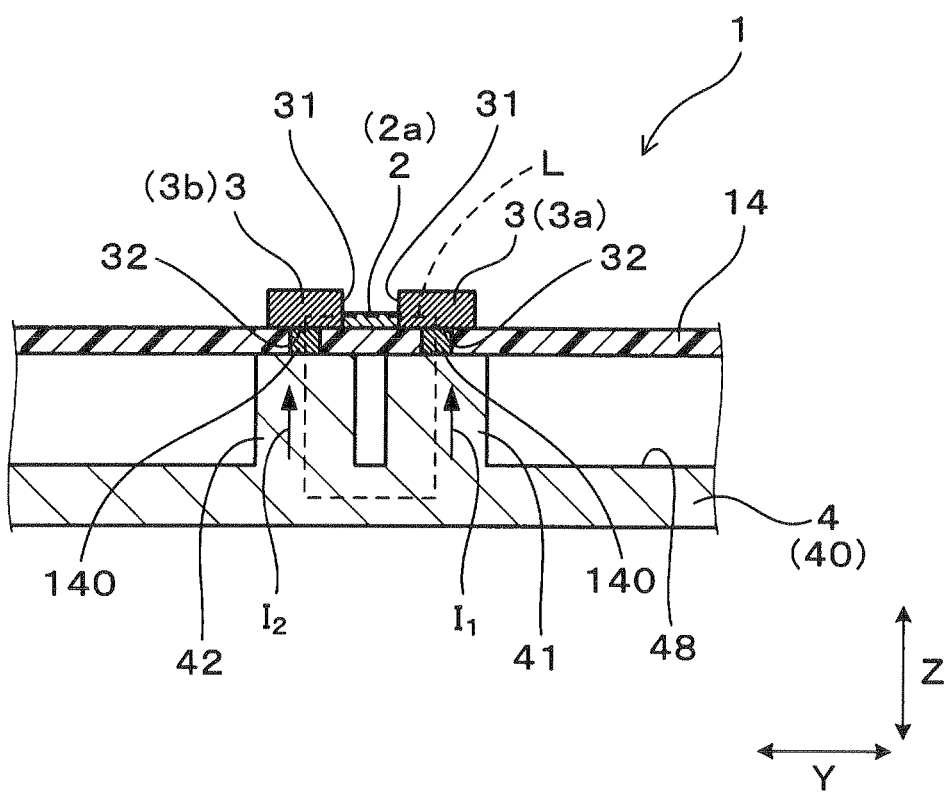
FIG. 11 is a view showing a cross section along the XI-XI line shown in FIG. 10.

As shown in FIG. 10 and FIG. 11, the structure of the current loop L in the noise filter 1 according to the second exemplary embodiment does not contain any conducting wire 6. The first electrode 31 of each of the first capacitor 3a and the second capacitor 3b is electrically connected directly to the external terminal 2. Further, connection members 140 are embedded in the printed circuit substrate 14, which are in contact with the first metal strut 41 and the second metal strut 42, respectively, projected from the bottom surface 48 of the housing casing 4. The second electrode 32 of each of the first capacitor 3a and the second capacitor 3b is electrically connected to the connection members 140, respectively. That is, the current loop L in the second exemplary embodiment is formed by the first capacitor 3a and the second capacitor 3b, the external terminal 2, the connection members 140, the first metal strut 41, the second metal strut 42 and the housing casing 4.

Further, as shown in FIG. 10, the alternating magnetic field generation section 7 is generated in the electric power conversion circuit 10, and a distance ra between the first capacitor 3a and the alternating magnetic field generation section 7 is equal to a distance rb between the second capacitor 3b and the alternating magnetic field generation section 7.

Still further, there are the first area S1 and the second area S2 in the current loop L, similar to the structure disclosed in the first exemplary embodiment. The magnetic flux φ of the alternating magnetic field H penetrates in the first area S1 and the second area S2. Similar to the first exemplary embodiment, the electric power conversion device 11 equipped with the noise filter 1 according to the second exemplary embodiment has a structure to generate the first induced noise current I1 and the second induced noise current I2 in the current loop L, where the first induced noise current I1 flows in a reverse direction of the second induced noise current I2.

Other components disclosed in the second exemplary embodiment are equal to those of the first exemplary embodiment and referred with the same reference numbers and characters shown in FIG. 10 and FIG. 11. The explanation of the same components is also omitted here for brevity.

Third Exemplary Embodiment

A description will be given of the noise filter according to a third exemplary embodiment with reference to FIG. 12.

Figure 12:
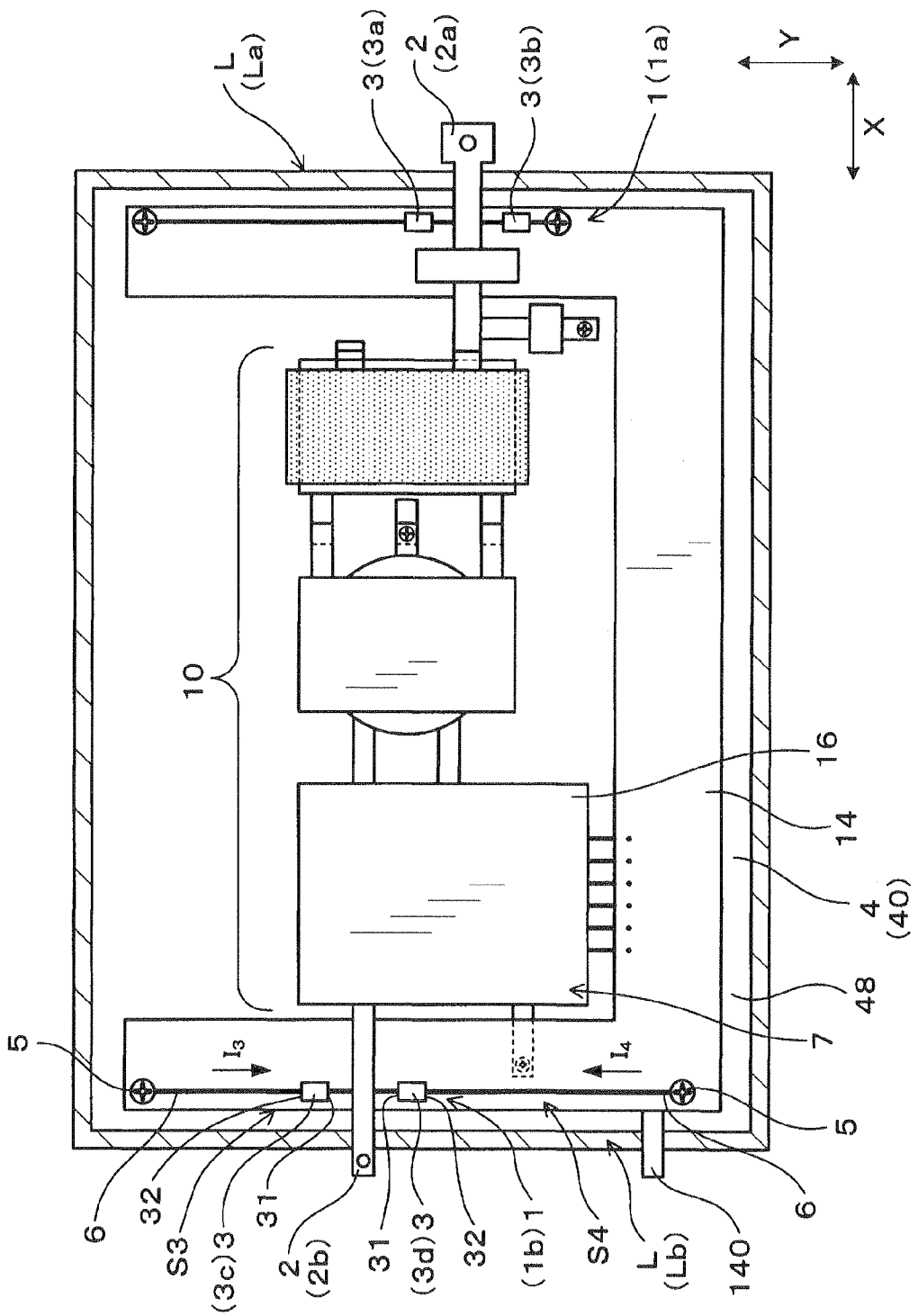
FIG. 12 is a plan view showing a pair of the noise filters according to a third exemplary embodiment of the present invention assembled to the electric power conversion device.

FIG. 12 is a plan view showing a pair of the noise filters according to a third exemplary embodiment assembled to the electric power conversion device.

As shown in FIG. 12, the pair of a first noise filter 1a and a second noise filter 1b is assembled to the electric power conversion device 11. In the structure disclosed in the third exemplary embodiment, the first noise filter 1a is electrically connected to the output terminal 2a in the external terminal 2, and the input terminal 2b of the external terminal 2 is electrically connected to the second noise filter 1b. Further, the input terminal 2b is mounted on the printed circuit substrate 14 and the first capacitor 3c and the second capacitor 3d are fixed to the printed circuit substrate 14. The first electrode 31 of each of the first capacitor 3c and the second capacitor 3d is electrically connected to the input terminal 2b, and the second electrode 32 of each of the first capacitor 3c and the second capacitor 3d is electrically connected to the housing casing 4. In the structure disclosed in the third exemplary embodiment, the first capacitor 3c, the second capacitor 3d, the input terminal 2b and the housing casing 4 form the current loop L (as a second current loop Lb) through which a current flows.

Metal struts made of metal (omitted from FIG. 13) project from the bottom surface 48 of the housing casing 4, like the first exemplary embodiment. The second electrode 32 of each of the first capacitor 3c and the second capacitor 3d is electrically connected to the corresponding bolt 5 through the conducting wires 6. In addition, the first electrode 31 of each of the first capacitor 3c and the second capacitor 3d is electrically connected to the input terminal 2 through the corresponding conducting wire 6.

The second noise filter 1b grounds a conductive noise current, where the conductive noise current is transmitted from an external device into the electric power conversion circuit 10 through the input terminal 2b. In addition, an alternating magnetic field H is generated in the MOS module 16 arranged close to the second noise filter 1b. A magnetic flux of the alternating magnetic field H penetrates in an area S3 and an area S4 in the current loop L. This generates an induced noise current I3 and an induced noise current I4, which flows in a reverse direction to each other, in a second current loop Lb. Because the induced noise current I3 and the induced noise current I4 cancel each other out, and as a result, this can prevent transmission of a large induced noise current to an external device through the input terminal 2b.

Other components disclosed in the third exemplary embodiment are equal to those of the first exemplary embodiment and referred with the same reference numbers and characters shown in FIG. 12. The explanation of the same components is omitted here for brevity.

Fourth Exemplary Embodiment

A description will be given of the noise filter according to a fourth exemplary embodiment with reference to FIG. 13.

Figure 13:
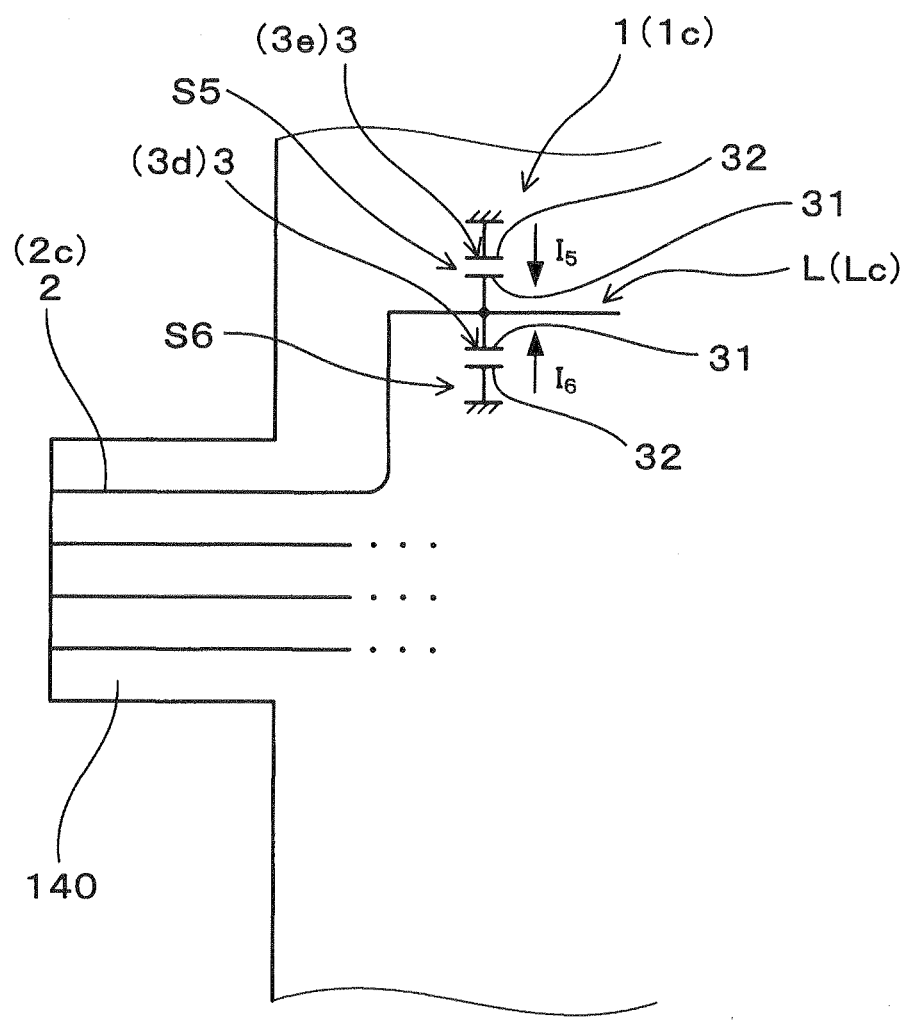
FIG. 13 is a view showing a conductive signal wire connected to the noise filter according to the fourth exemplary embodiment of the present invention assembled to the electric power conversion device.

FIG. 13 is a view showing a conductive signal wire connected to the noise filter according to the fourth exemplary embodiment assembled to the electric power conversion device. As shown in FIG. 13, the fourth exemplary embodiment shows a structure in which a noise filter 1c (as a third noise filter) is electrically connected to the signal terminal 2c through a conductive signal wire.

That is, the noise filter 1c is comprised of a capacitor 3e and a capacitor 3d. The first electrode 31 of each of the capacitor 3e and the capacitor 3d is electrically connected to the signal terminal 2c through the conductive signal wire. The second electrode 32 of each of the capacitor 3e and the capacitor 3d is electrically connected to the housing casing 4 (omitted from FIG. 13), i.e. grounded. The capacitor 3e, the capacitor 3d, the conductive signal wire connected to the signal terminal 2c and the housing casing 4 form the current loop L (as a third current loop Lc).

The signal conductive line connected to the signal terminal 2c is extended from the connection member 140 (or the connector 140) of the printed circuit substrate 14 to the inside of the printed circuit substrate 14. An external device (omitted from FIG. 13) transmits a control signal to the conductive signal wire through the signal terminal 2c in order to turn on/off the MOS elements 160 (see FIG. 9).

The magnetic flux ϕ of the alternating magnetic field H penetrates in an area S5 and an area S6 formed in the third current loop Lc. This can generate an induced noise current I5 and an induced noise current I6 in the third current loop Lc, which flow in a reverse direction to each other. The induced noise current I5 and the induced noise current I6 are cancelled with respect out to each other. It is thereby possible to prevent transmission of a large induced noise current to the external device (not shown) through the signal terminal 2c connected to the conductive signal wire.

Other components disclosed in the fourth exemplary embodiment are equal to those of the first exemplary embodiment and referred with the same reference numbers and characters shown in FIG. 13. The explanation of the same components is omitted here for brevity.

Fifth Exemplary Embodiment

A description will be given of the noise filter according to a fifth exemplary embodiment with reference to FIG. 14.

Figure 14:
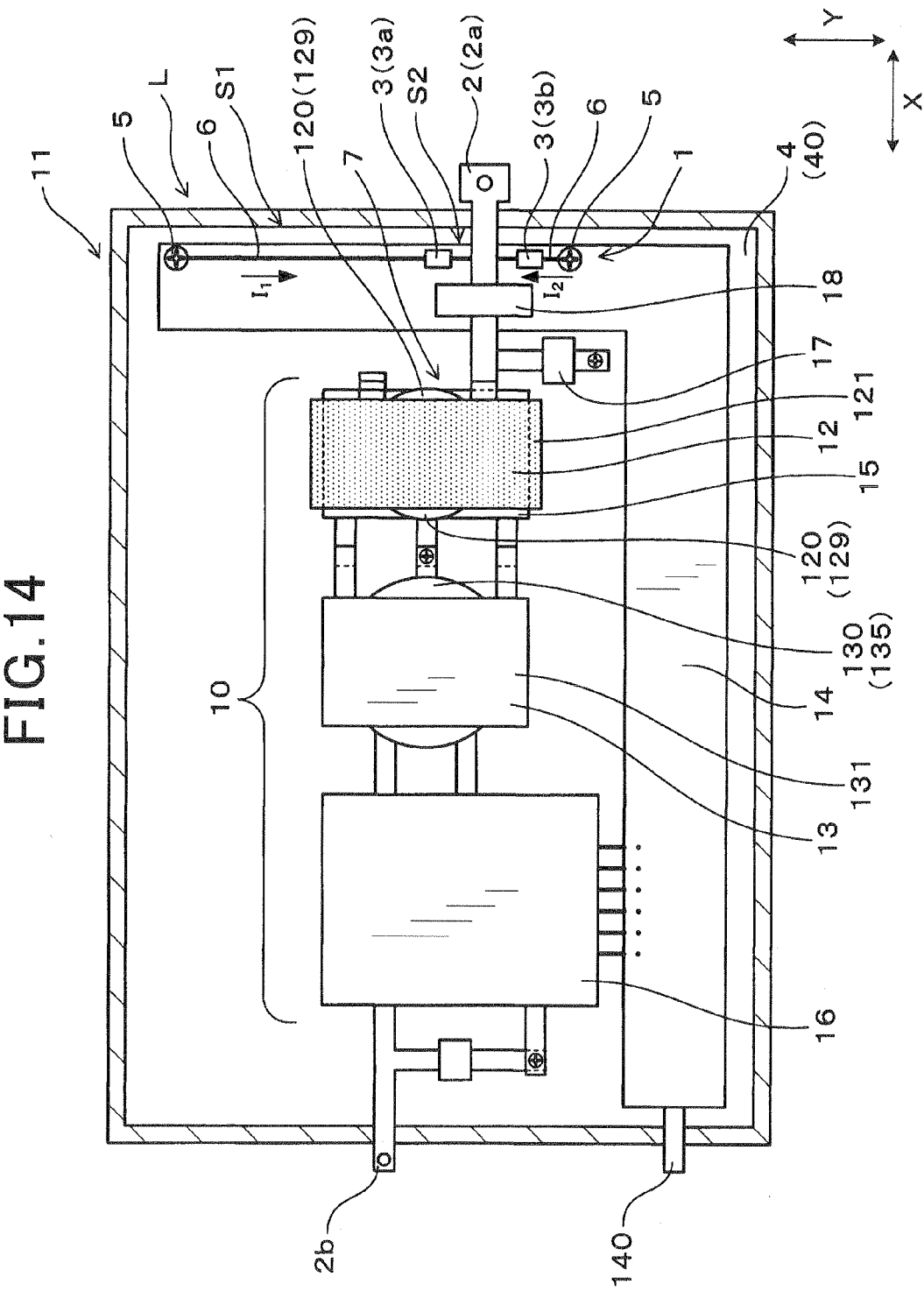
FIG. 14 is a plan view showing the noise filter according to a fifth exemplary embodiment of the present invention assembled to the electric power conversion device.

FIG. 14 is a plan view showing the noise filter according to the fifth exemplary embodiment assembled to the electric power conversion device. As shown in FIG. 14, the fifth exemplary embodiment shows a choke coil 12 which has a different structure of the choke coil 12 used in the first exemplary embodiment. That is, the choke coil 12 is comprised of the winding section 120 and the core 121 which surrounds the winding section 120. The core 121 is made of soft magnetic member. A part 129 of the winding section 120 is exposed from the core 121. An alternating magnetic field H is generated at the part 129 of the winding section 120. A magnetic flux ϕ of the alternating magnetic field H penetrates in the first area S1 and the second area S2 in the current loop L.

In particular, the part 129 is exposed from the core 121 in the choke coil 12 and generates a strong alternating magnetic field H. Even if a strong alternating magnetic field H is generated by the part 129, the noise filter according to the fifth exemplary embodiment prevent transmission of a strong induced noise current to the external terminal 2. That is, the electric power conversion device, to which the noise filter according to the fifth exemplary embodiment is assembled, has a structure in which the magnetic flux ϕ of the alternating magnetic field H penetrates in the first area S1 and the second area S2 in the current loop L, and the first induced noise current I1 generated in the first area S1 flows in a reverse direction of the second induced noise current I2 generated in the second area S2. Accordingly, even if a strong alternating magnetic field H is generated, it is possible to cancel the first induced noise current I1 and the second induced noise current I2 to each other. This can prevent transmission of a large induced noise current to the external terminal 2.

It is possible for the transformer 13 to generate an alternating magnetic field H. The transformer 13 is comprised of a transformer winding section 130 and a transformer core 131. The transformer winding section 130 is comprised of the primary coil 130a and the secondary coil 130b. The transformer core 131 surrounds the transformer winding section 130. A part 135 of the transformer winding section 130 is exposed from the transformer core 131. It is possible to have a structure in which the exposed part 135 generates an alternating magnetic field H, and the magnetic flux ϕ of the alternating magnetic field H penetrates in the first area S1 and the second area S2 in the current loop L.

In particular, the exposed part 135 which is exposed from the transformer core 131 generates a strong alternating magnetic field H. Even if the strong alternating magnetic field H is generated by the exposed part 135, the noise filter according to the fifth exemplary embodiments prevent transmission of a strong induced noise current to the external terminal 2. That is, the electric power conversion device equipped with the noise filter according to the fifth exemplary embodiment has a structure in which the magnetic flux ϕ of the alternating magnetic field H penetrates in the first area S1 and the second area S2 in the current loop L, and the first induced noise current I1 generated in the first area S1 flows in a reverse direction of the second induced noise current I2 generated in the second area S2. Accordingly, even if a strong alternating magnetic field H is generated, it is possible to cancel the first induced noise current I1 and the second induced noise current I2 with respect to each other. This can prevent transmission of a large induced noise current to the external terminal 2.

Other components disclosed in the fifth exemplary embodiment are equal to those of the first exemplary embodiment and referred with the same reference numbers and characters shown in FIG. 14. The explanation of the same components is omitted here for brevity.

Sixth Exemplary Embodiment

A description will be given of the noise filter according to a sixth exemplary embodiment with reference to FIG. 15.

Figure 15:
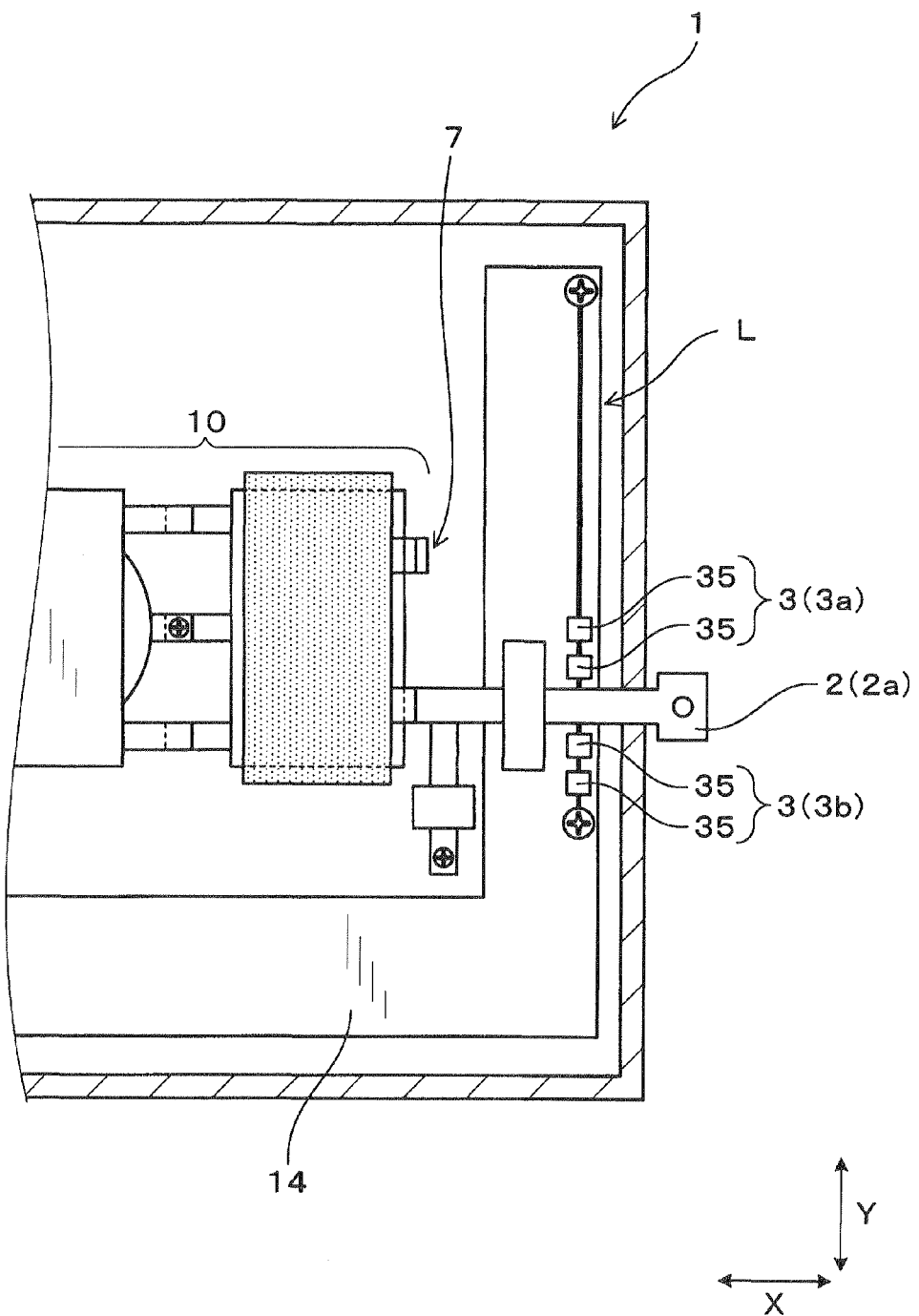
FIG. 15 is a plan view showing the noise filter according to a sixth exemplary embodiment of the present invention assembled to the electric power conversion device.

FIG. 15 is a plan view showing the noise filter according to the sixth exemplary embodiment assembled to the electric power conversion device. As shown in FIG. 15, the sixth exemplary embodiment discloses the noise filter comprised of the capacitor 3. The capacitor 3 is comprised of the first capacitor 3a and the second capacitor 3b. In particular, the first capacitor 3a is comprised of two sub-capacitors 35 connected in series, and the second capacitor 3b is comprised of two sub-capacitors 35 connected in series. This structure of the capacitor 3 makes it possible to perform correct operation even if a malfunction occurs in one of the sub-capacitors 35. This structure makes it possible to provide the noise filter having a strong resistant to a failure. It is also possible to have a structure in which each of the first capacitor 3a and the second capacitor 3b is comprised of not less than three sub-capacitors 35.

Similarly, it is also possible to have another structure in which each of the first capacitor 3a and the second capacitor 3b is comprised of a plurality of sub-capacitors 35 connected in parallel. Because this structure makes it possible to increase the whole capacitance of each of the first capacitor 3a and the second capacitor 3b, it is possible to decrease an impedance of the noise filter, and easily flow the induced noise current to the housing casing 4, i.e. to the ground.

Other components disclosed in the sixth exemplary embodiment are equal to those of the first exemplary embodiment and referred with the same reference numbers and characters shown in FIG. 15. The explanation of the same components is omitted here for brevity.

Seventh Exemplary Embodiment

A description will be given of the noise filter according to a seventh exemplary embodiment with reference to FIG. 16.

Figure 16:
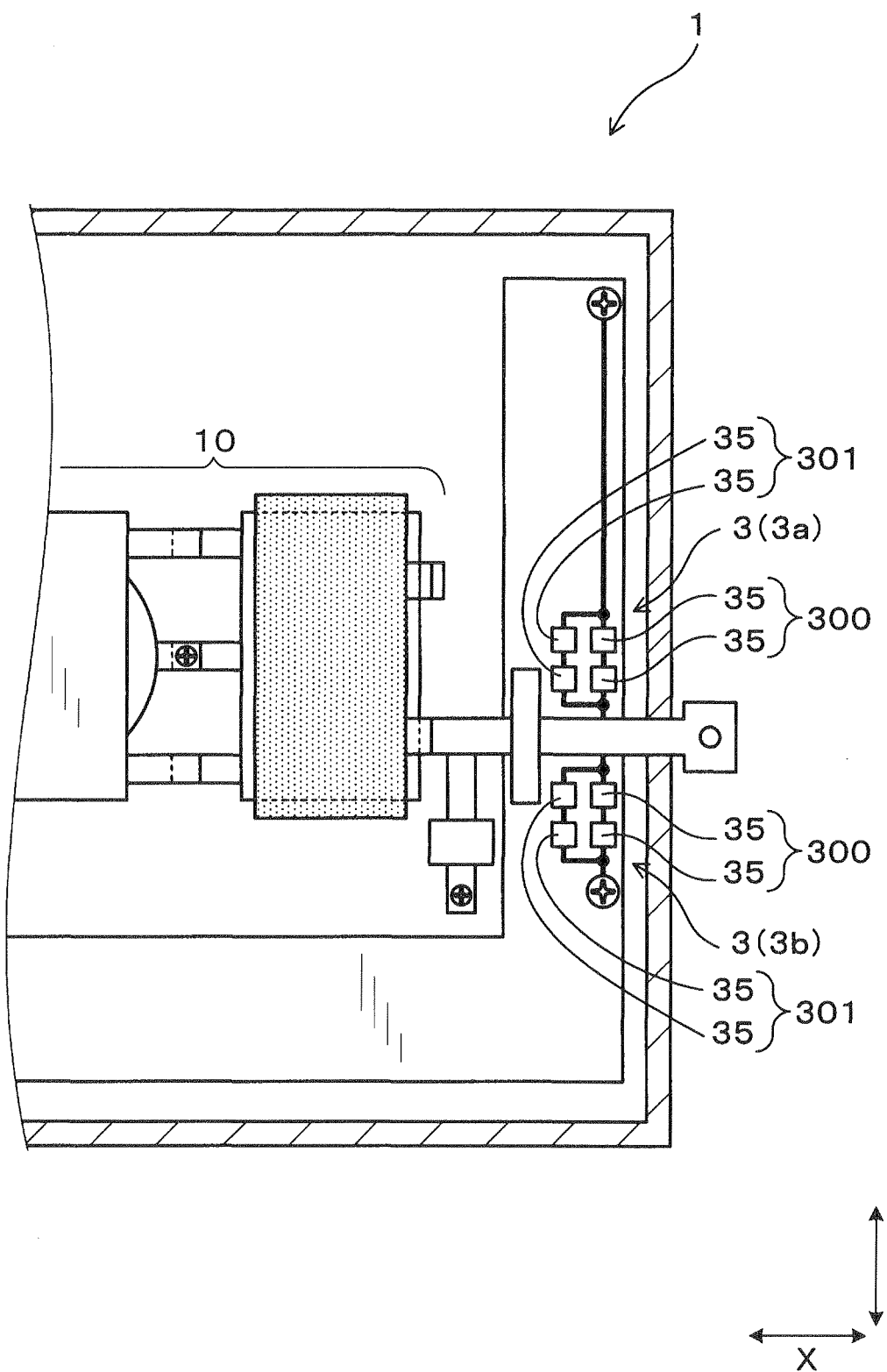
FIG. 16 is a plan view showing the noise filter according to a seventh exemplary embodiment of the present invention assembled to the electric power conversion device.

FIG. 16 is a plan view showing the noise filter according to the seventh exemplary embodiment assembled to the electric power conversion device. As shown in FIG. 16, the seventh exemplary embodiment discloses the noise filter comprised of the capacitor 3. The capacitor 3 is comprised of a first sub-capacitor group 300 and a second sub-capacitor group 301. In particular, the first sub-capacitor group 300 is comprised of a pair of sub-capacitors 35 connected in series, the second sub-capacitor group 301 is comprised of a pair of sub-capacitors 35 connected in series, and the first sub-capacitor group 300 is connected in parallel to the second sub-capacitor group 301. That is, the capacitor 3 is comprised of the four sub-capacitors 35.

Because the sub-capacitors 35 are connected in series in the first sub-capacitor group 300, and the sub-capacitors 35 are connected in series in the second sub-capacitor group 301, this structure makes it possible to provide the noise filter having a strong resistant to a short-circuit failure. In addition to this feature, because the first sub-capacitor group 300 is connected in parallel to the second sub-capacitor group 301, this structure makes it possible to increase a whole capacitance of the capacitor 3 and easily allow the induced noise current to flow to ground.

Other components disclosed in the seventh exemplary embodiment are equal to those of the first exemplary embodiment and referred with the same reference numbers and characters shown in FIG. 16. The explanation of the same components is omitted here for brevity.

Eighth Exemplary Embodiment

A description will be given of the noise filter according to an eighth exemplary embodiment with reference to FIG. 17.

Figure 17:
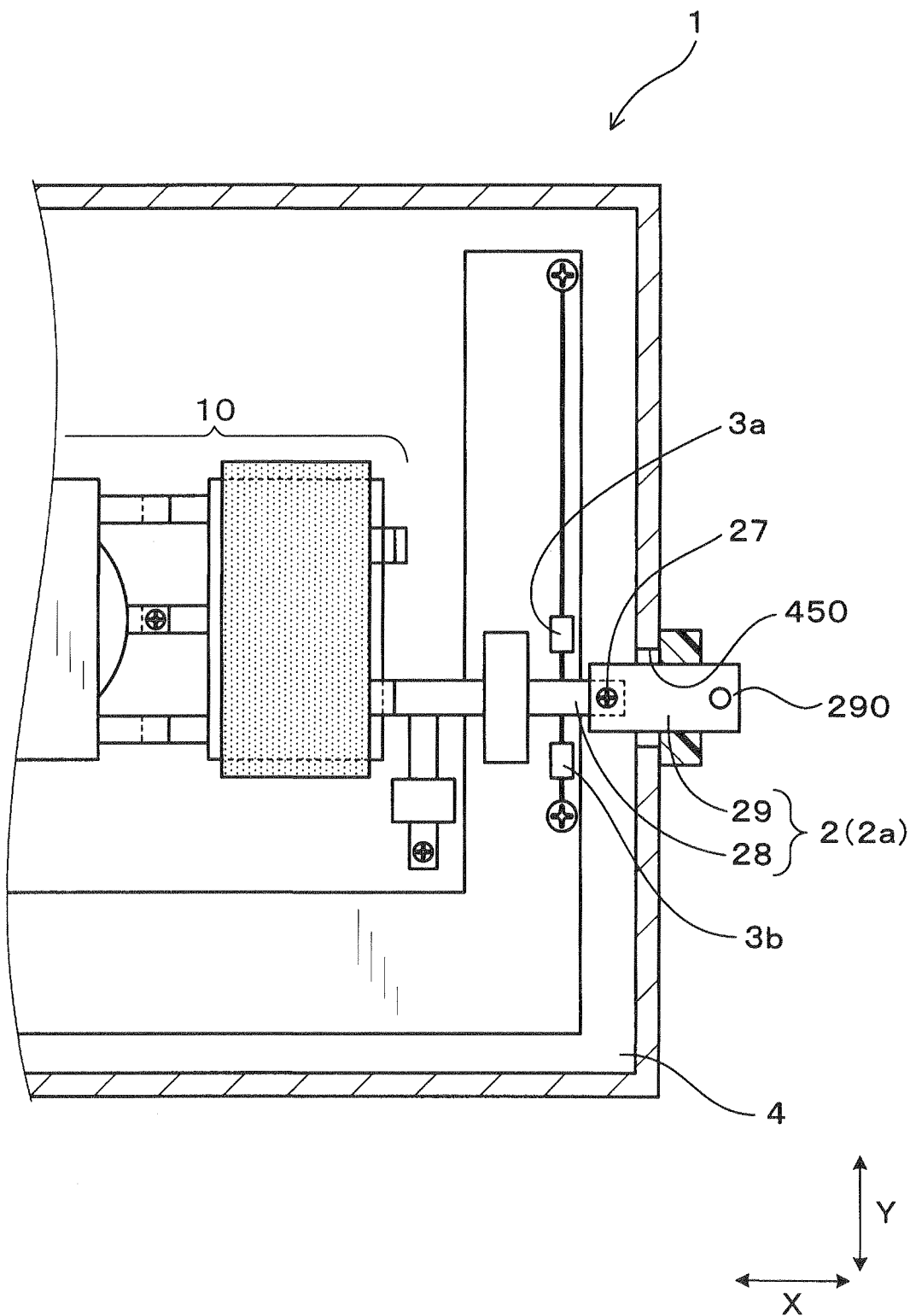
FIG. 17 is a plan view showing the noise filter according to an eighth exemplary embodiment of the present invention assembled with the electric power conversion device.

FIG. 17 is a plan view showing the noise filter according to the eighth exemplary embodiment assembled with the electric power conversion device. As shown in FIG. 17, the eighth exemplary embodiment shows a structure in which the external terminal 2 is comprised of the first section 28 and the second section 29. The first section 28 is arranged in the inside of the housing casing 4. The first capacitor 3a and the second capacitor 3b are electrically connected to the first section 28. An opening section 450 is formed in the housing casing 4. The second section 29 of the external terminal 2 is inserted into and arranged through the opening section 450. The first section 28 is connected and fixed to the second section by a screw 27. An external device is electrically connected to the electric power conversion circuit 10 through a front section 290 of the second section 29 in the external terminal 2.

Other components disclosed in the eighth exemplary embodiment are equal to those of the first exemplary embodiment and referred with the same reference numbers and characters shown in FIG. 17. The explanation of the same components is omitted here for brevity.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalents thereof.

What is claimed is:

1. A noise filter connected to an external terminal through which an electric power conversion circuit is connected to an external device, the noise filter comprising a housing casing made of metal electrically grounded, and a first capacitor and a second capacitor which are accommodated in the housing casing, wherein
   a first electrode of each of the first capacitor and the second capacitor is electrically connected to the external terminal, a second electrode of each of the first capacitor and the second capacitor is electrically connected to the housing casing, and
   a current loop consists of the first capacitor, the second capacitor, the external terminal and the housing casing so that a first area and a second area is formed in the current loop, and a magnetic flux of an alternating magnetic field generated in a part of the electric power conversion circuit penetrates in the first area and the second area, a first induced noise current is induced in the current loop when the magnetic flux of the generated magnetic field penetrates in the first area, and a second induced noise current is induced in the current loop when the magnetic flux of the generated magnetic field penetrates in the second area, and the first induced noise current flows in a reverse direction to the second induced noise current.

2. The noise filter according to claim 1, wherein a current ratio of the first induced noise current to the second induced noise current is within a range of 0.8 to 1.2.

3. The noise filter according to claim 2, wherein the current ratio of the first induced noise current to the second induced noise current is within a range of 0.9 to 1.1.

4. The noise filter according to claim 1, wherein the first electrode and the second electrode of each of the first capacitor and the second capacitor are electrically connected to conducting wires, and the first capacitor and the second capacitor are electrically connected to the external terminal and the housing casing through the conducting wires.

5. The noise filter according to claim 2, wherein the first electrode and the second electrode of each of the first capacitor and the second capacitor are electrically connected to conducting wires, and the first capacitor and the second capacitor are electrically connected to the external terminal and the housing casing through the conducting wires.

6. The noise filter according to claim 3, wherein the first electrode and the second electrode of each of the first capacitor and the second capacitor are electrically connected to conducting wires, and the first capacitor and the second capacitor are electrically connected to the external terminal and the housing casing through the conducting wires.

7. The noise filter according to claim 1, wherein the first capacitor and the second capacitor are electrically connected to a printed circuit board, and a first metal strut and a second metal strut made of metal project in a normal direction of a bottom surface of the housing casing from the bottom surface of the housing casing so that the printed circuit board is supported by the first and second metal struts, and the first and second metal struts form a part of the current loop.

8. The noise filter according to claim 2, wherein the first capacitor and the second capacitor are electrically connected to a printed circuit board, and a first metal strut and a second metal strut made of metal project in a normal direction of a bottom surface of the housing casing from the bottom surface of the housing casing so that the printed circuit board is supported by the first and second metal struts, and the first and second metal struts form a part of the current loop.

9. The noise filter according to claim 3, wherein the first capacitor and the second capacitor are electrically connected to a printed circuit board, and a first metal strut and a second metal strut made of metal project in a normal direction of a bottom surface of the housing casing from the bottom surface of the housing casing so that the printed circuit board is supported by the first and second metal struts, and the first and second metal struts form a part of the current loop.

10. The noise filter according to claim 4, wherein the first capacitor and the second capacitor are electrically connected to a printed circuit board, and a first metal strut and a second metal strut made of metal project in a normal direction of a bottom surface of the housing casing from the bottom surface of the housing casing so that the printed circuit board is supported by the first and second metal struts, and the first and second metal struts form a part of the current loop.

11. The noise filter according to claim 7, wherein an alternating current flows in the normal direction of the bottom surface of the housing casing when the alternating current generates the alternating magnetic field, and a first distance is equal to a second distance when measured along the normal direction, where the first distance is a length between the first metal strut and an alternating magnetic field generation part in which the alternating current flows, and the second distance is a length between the second metal strut and the alternating magnetic field generation part.

12. The noise filter according to claim 8, wherein an alternating current flows in the normal direction of the bottom surface of the housing casing when the alternating current generates the alternating magnetic field, and a first distance is equal to a second distance when measured along the normal direction, where the first distance is a length between the first metal strut and an alternating magnetic field generation part in which the alternating current flows, and the second distance is a length between the second metal strut and the alternating magnetic field generation part.

13. The noise filter according to claim 9, wherein an alternating current flows in the normal direction of the bottom surface of the housing casing when the alternating current generates the alternating magnetic field, and a first distance is equal to a second distance when measured along the normal direction, where the first distance is a length between the first metal strut and an alternating magnetic field generation part in which the alternating current flows, and the second distance is a length between the second metal strut and the alternating magnetic field generation part.

14. The noise filter according to claim 10, wherein an alternating current flows in the normal direction of the bottom surface of the housing casing when the alternating current generates the alternating magnetic field, and a first distance is equal to a second distance when measured along the normal direction, where the first distance is a length between the first metal strut and an alternating magnetic field generation part in which the alternating current flows, and the second distance is a length between the second metal strut and the alternating magnetic field generation part.

15. The noise filter according to claim 1, wherein the first capacitor is comprised of a pair of sub-capacitors connected in series, and the second capacitor is comprised of a pair of sub-capacitors connected in series.

16. The noise filter according to claim 1, wherein the first capacitor is comprised of a pair of groups connected in parallel, and each of the groups in the first capacitor is comprised of a pair of sub-capacitors connected in series, and the second capacitor is comprised of a pair of groups connected in parallel, and each of the groups in the second capacitor is comprised of a pair of sub-capacitors connected in series.

17. A noise filter connected to an external terminal through which an electric power conversion circuit is connected to an external device, the noise filter comprising a housing casing made of metal electrically grounded, and a first capacitor and a second capacitor which are accommodated in the housing casing, wherein a first electrode of each of the first capacitor and the second capacitor is electrically connected to the external terminal, a second electrode of each of the first capacitor and the second capacitor is electrically connected to the housing casing;

the first capacitor, the second capacitors, the external terminal and the housing casing form a current loop so that a first area and a second area is formed in the current loop, and a magnetic flux of an alternating magnetic field generated in a part of the electric power conversion circuit penetrates in the first area and the second area, a first induced noise current is induced in the current loop when the magnetic flux of the generated magnetic field penetrates in the first area, and a second induced noise current is induced in the current loop when the magnetic flux of the generated magnetic field penetrates in the second area, and the first induced noise current flows in a reverse direction to the second induced noise current; and the first capacitor and the second capacitor are electrically connected to a printed circuit board, and a first metal strut and a second metal strut made of metal project in a normal direction of a bottom surface of the housing casing from the bottom surface of the housing casing so that the printed circuit board is supported by the first and second metal struts, and the first and second metal struts form a part of the current loop.

18. The noise filter according to claim 17, wherein an alternating current flows in the normal direction of the bottom surface of the housing casing when the alternating current generates the alternating magnetic field, and a first distance is equal to a second distance when measured along the normal direction, where the first distance is a length between the first metal strut and an alternating magnetic field generation part in which the alternating current flows, and the second distance is a length between the second metal strut and the alternating magnetic field generation part.

19. A noise filter connected to an external terminal through which an electric power conversion circuit is connected to an external device, the noise filter comprising a housing casing made of metal electrically grounded, and a first capacitor and a second capacitor which are accommodated in the housing casing, wherein a first electrode of each of the first capacitor and the second capacitor is electrically connected to the external terminal, a second electrode of each of the first capacitor and the second capacitor is electrically connected to the housing casing, and a current loop includes only passive elements, and the current loop includes the first capacitor, the second capacitor, the external terminal and the housing casing so that a first area and a second area is formed in the current loop, and a magnetic flux of an alternating magnetic field generated in a part of the electric power conversion circuit penetrates in the first area and the second area, a first induced noise current is induced in the current loop when the magnetic flux of the generated magnetic field penetrates in the first area, and a second induced noise current is induced in the current loop when the magnetic flux of the generated magnetic field penetrates in the second area, and the first induced noise current flows in a reverse direction to the second induced noise current.

* * * * *